United States Patent
Zhao et al.

(10) Patent No.: US 10,360,063 B2
(45) Date of Patent: Jul. 23, 2019

(54) PROACTIVE RESOURCE MANAGEMENT FOR PARALLEL WORK-STEALING PROCESSING SYSTEMS

(71) Applicant: QUALCOMM Incorporated, San Diego, CA (US)

(72) Inventors: Han Zhao, Santa Clara, CA (US); Dario Suárez Gracia, Teruel (ES); Tushar Kumar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 14/862,373

(22) Filed: Sep. 23, 2015

(65) Prior Publication Data

US 2017/0083364 A1    Mar. 23, 2017

(51) Int. Cl.
*G06F 9/48* (2006.01)
*G06F 9/50* (2006.01)

(52) U.S. Cl.
CPC .......... *G06F 9/4818* (2013.01); *G06F 9/4881* (2013.01); *G06F 9/4893* (2013.01); *G06F 9/5083* (2013.01); *G06F 9/5088* (2013.01); *Y02D 10/24* (2018.01); *Y02D 10/32* (2018.01)

(58) Field of Classification Search
CPC .... G06F 9/4818; G06F 9/4881; G06F 9/5083; G06F 9/4893; G06F 9/5088; Y02D 10/32; Y02D 10/24
See application file for complete search history.

(56) References Cited

U.S. PATENT DOCUMENTS

| | | |
|---|---|---|
| 7,886,172 B2 | 2/2011 | Bose et al. |
| 8,276,164 B2 | 9/2012 | Munshi et al. |
| 8,468,507 B2 | 6/2013 | Agarwal et al. |

(Continued)

OTHER PUBLICATIONS

Ravichandran et al. Work Stealing for Multi-core HPC Clusters. [online] (2011). Springer., pp. 205-217. Retrieved From the Internet <http://download.springer.com/static/pdf/444/chp%253A10.1007%252F978-3-642-23400-2_20.pdf?originUrl=http%3A%2F%2Flink.springer.com%2Fchapter%2F10.1007%2F978-3-642-23400-2_20&token2=exp=1471799690~acl=%2Fst>.*

(Continued)

*Primary Examiner* — Emerson C Puente
*Assistant Examiner* — Jonathan R Labud
(74) *Attorney, Agent, or Firm* — The Marbury Law Group, PLLC

(57) ABSTRACT

Various embodiments proactively balance workloads between a plurality of processing units of a multi-processor computing device by making work-stealing determinations based on operating state data. An embodiment method includes obtaining static characteristics data associated with each of a victim processor and one or more of a plurality of processing units that are ready to steal work items from the victim processor (work-ready processors), obtaining dynamic characteristics data for each of the processors, calculating priority values for each of the processors based on the obtained data, and transferring a number of work items assigned to the victim processor to a winning work-ready processor based on the calculated priority values. In some embodiments, the method may include acquiring control over a probabilistic lock for a shared data structure and updating the shared data structure to indicate the number of work items transferred to the winning work-ready processor.

28 Claims, 9 Drawing Sheets

(56) References Cited

U.S. PATENT DOCUMENTS

| | | | |
|---|---|---|---|
| 8,510,741 B2 | 8/2013 | Leiserson | |
| 8,533,716 B2 | 9/2013 | Lippett et al. | |
| 8,566,537 B2 | 10/2013 | Ni et al. | |
| 8,572,622 B2 | 10/2013 | Alexander et al. | |
| 8,707,314 B2 | 4/2014 | Gummaraju et al. | |
| 8,782,645 B2 | 7/2014 | Breternitz et al. | |
| 8,892,931 B2 | 11/2014 | Kruglick | |
| 8,954,986 B2 | 2/2015 | Rajagopalan et al. | |
| 2006/0095913 A1 | 5/2006 | Bodas et al. | |
| 2010/0058352 A1 | 3/2010 | Esfahany et al. | |
| 2012/0263125 A1 | 10/2012 | Tejaswini et al. | |
| 2014/0006666 A1 | 1/2014 | Hiraki et al. | |
| 2014/0282578 A1* | 9/2014 | Teller | G06F 9/5088 718/104 |
| 2014/0282595 A1 | 9/2014 | Lev et al. | |
| 2015/0067700 A1 | 3/2015 | Kim et al. | |
| 2015/0089249 A1 | 3/2015 | Hannon et al. | |
| 2015/0324234 A1* | 11/2015 | Chang | G06F 9/5033 718/104 |
| 2017/0060633 A1 | 3/2017 | Suarez Gracia et al. | |
| 2017/0075734 A1 | 3/2017 | Raman | |
| 2017/0083365 A1 | 3/2017 | Zhao et al. | |
| 2017/0083382 A1* | 3/2017 | LeBeane | G06F 1/206 |

OTHER PUBLICATIONS

Menasce et al. Static and Dynamic Processor Scheduling Disciplines in Heterogeneous Parallel Architectures. [online] (1995). Academic Press., pp. 1-43. Retrieved From the Internet <https://www.semanticscholar.org/paper/Static-and-Dynamic-Processor-Scheduling-Menase%C3%A9-Saha/6e02b6c4a3584499f63162cb92c59cdc9579ed87/pdf>.*

Benini L., et el., "Allocation, Scheduling and Voltage Scaling on Energy Aware MPSoCs," Integration of AI and OR Techniques in Constraint Programming or Combinatorial Optimization Problems, Lecture Notes Computer Science, 2006, vol. 3990, 15 pages.

Fisher N., et al., "Thermal-Aware Global Real-Time Scheduling on Multicore Systems," Feb. 3, 2010, 45 pages.

Shankar S., et al., "Power-Aware Work Stealing in Homogeneous Multicore Systems," Future Computing 2014: The Sixth International Conference on Future Computational Technologies and Applications, 2014, pp. 40-49.

International Search Report and Written Opinion—PCT/US2016/048989—ISA/EPO—dated Dec. 5, 2016.

Jovanovic N., "Task Scheduling in Distributed Systems by Work Stealing and Mugging—A Simulation Study", Journal of Computing and Information Technology, Dec. 31, 2002 (Dec. 31, 2002), XP055322717, vol. 10, No. 3, pp. 203-209, HR ISSN: 1330-1136, DOI: 10.2498/cit.2002.03.08.

Tchiboukdjian M., et al., "A Work Stealing Scheduler for Parallel Loops on Shared Cache Multicores", In Network and Parallel Computing, Springer International Publishing, Cham 032548, XP055321445, Jan. 1, 2011 (Jan. 1, 2011), vol. 6586, pp. 99-107.

* cited by examiner

PROACTIVE RESOURCE MANAGEMENT FOR PARALLEL WORK-STEALING PROCESSING SYSTEMS

BACKGROUND

Data parallel processing is a form of computing parallelization across multiple processing units. Data parallel processing is often used to perform workloads that can be broken up and concurrently executed by multiple processing units. For example, to execute a parallel loop routine having 1000 iterations, four different processing units may each be configured to perform 250 different iterations (or different sub ranges) of the parallel loop routine. In the context of data parallel processing, a task can represent an abstraction of sequential computational work that may have a dynamic working size that is typically determined at runtime. For example, a processor can execute a task that processes a sub-range of a parallel loop routine. In some cases, a task may be created by a thread running on a first processor and dispatched to be processed via another thread on a second processor.

Different tasks may be assigned (or offloaded to) various processing units of a multi-core or multi-processor computing device (e.g., a heterogeneous system-on-chip (SOC)). Typically, a task-based runtime system (or task scheduler) determines to which processing unit a task may be assigned. For example, a scheduler can launch a set of concurrently-executing tasks on a plurality of processing units, each unit differently able to perform operations on data for a parallel loop routine.

Multi-processor (or multi-core) systems are often configured to implement data parallelism techniques to provide responsive and high performance software. For example, with data parallel processing capabilities, a multi-core device commonly launches a number of dynamic tasks on different processing units in order to achieve load balancing. Parallel workloads may get unbalanced between various processing units. For example, while multiple processing units may initially get equal sub-ranges of a parallel loop routine, imbalance in execution time may occur. Imbalances in workloads may occur for many reasons, such as that the amount of work per work item is not constant (e.g., some work items may require less work than other work items, etc.); the capabilities of heterogeneous processing units may differ (e.g., big.LITTLE CPU cores, CPU vs. GPU, etc.); rising temperature may throttle frequencies on some processing units more than others, particularly if the heat dissipation is not uniform (as is commonly the case); and other loads may cause some processors to lag more (e.g., loads from other applications, the servicing of system interrupts, and/or the effects of OS scheduling, etc.).

To improve performance while conducting data parallel processing, multi-processor systems may employ work-stealing techniques in which tasks or processing units can be configured to opportunistically take and execute work items originally assigned to other tasks or processing units. For example, when a first processing unit or task finishes an assigned subrange of a shared workload (e.g., a parallel loop routine), the first processing unit may steal additional sub-ranges of work from other processing units/tasks that are still busy processing respective assignments of the shared workload. As load imbalances may often occur, work-stealing operations may allow dynamic load-balancing that improves the utilization of system processing resources and reduces the time to complete parallel work.

SUMMARY

Various embodiments provide methods, devices, systems, and non-transitory process-readable storage media for a multi-processor computing device to proactively balance workloads among a plurality of processing units by making work-stealing determinations based on operating state data. An embodiment method performed by a processor of the multi-processor computing device may include operations for obtaining static characteristics data associated with each of a victim processor and one or more of the plurality of processing units that are ready to steal work items from the victim processor (work-ready processors), obtaining dynamic characteristics data associated with each of the victim processor and the work-ready processors, calculating priority values for each of the victim processor and the work-ready processors based on the obtained data, and transferring a number of work items assigned to the victim processor to a winning work-ready processor based on the calculated priority values.

In some embodiments, the work-ready processors may be ready to steal the work items from the victim processor in response to the work-ready processors finishing respective assigned work items. In some embodiments, the static characteristics data associated with each of the victim processor and the work-ready processors may include any of data indicating a technology used, a location in a topology of the multi-processor computing device, and manufacturer data. In some embodiments, the static characteristics data may be obtained at a time of manufacture of the multi-processor computing device, at each boot-up of the multi-processor computing device, on a periodic basis, or any combination thereof. In some embodiments, the dynamic characteristics data associated with each of the victim processor and the work-ready processors may include local measurements of each of the victim processor and the work-ready processors. In some embodiments, the dynamic characteristics data associated with each of the victim processor and the work-ready processors may include values associated with temperature, power consumption, and frequency.

In some embodiments, calculating the priority values for each of the victim processor and the work-ready processors based on the obtained data may include calculating the priority values using the following equation:

$$P_i = \alpha_i * f_i * \text{Temp}_i + \beta_i * g_i * \text{Power}_i + \gamma_i * h_i * \text{Freq}_i,$$

where i may represent an index for one of the victim processor and the work-ready processors, $P_i$ may represent a calculated priority value for a processing unit associated with the index for one of the victim processor and the work-ready processors, $\alpha_i$ may represent a global coefficient for temperature, $f_i$ may represent a local coefficient for the temperature for the processing unit, $\text{Temp}_i$ may represent a formula over a local temperature measurement for the processing unit, $\beta_i$ may represent a global coefficient for power consumption, $g_i$ may represent a local coefficient for the power consumption for the processing unit, $\text{Power}_i$ may represent a formula over a local power consumption measurement for the processing unit, $\gamma_i$ may represent a global coefficient for frequency, $h_i$ may represent a local coefficient for the frequency of the processing unit, and $\text{Freq}_i$ may represent a formula over a local frequency measurement for the processing unit. In some embodiments, obtaining the static characteristics data associated with each of the victim processor and the work-ready processors may include obtaining the global coefficient for temperature, the global coefficient for power consumption, and the global coefficient for frequency. In some embodiments, obtaining dynamic characteristics data associated with each of the victim processor and the work-ready processors may include obtaining the local coefficient for the temperature for the processing unit, the local temperature measurement for the processing unit, the local coefficient for the power consumption for the processing unit, the local power consumption measurement for the processing unit, the local coefficient for the frequency of the processing unit, and the local frequency measurement for the processing unit.

In some embodiments, the method may further include calculating the number of work items to transfer to the winning work-ready processor based on the calculated priority values of the victim processor and the winning work-ready processor.

In some embodiments, calculating the number of work items to transfer to the winning work-ready processor based on the calculated priority values of the victim processor and the winning work-ready processor may include calculating the number of work items to transfer using the following equations:

$$N_i = K*(P_i/(P_i+P_j)),$$

$$N_j = K - N_i,$$

where i may represent a first task index associated with the victim processor, j may represent a second task index associated with the winning work-ready processor, K may represent a total number of work items remaining to be processed by the victim processor prior to stealing, $P_j$ may represent a calculated priority value of the victim processor, and $P_i$ may represent the calculated priority value of the winning work-ready processor, $N_i$ may represent the number of work items to transfer to the winning work-ready processor, and $N_j$ may represent a number of work items to remain with the victim processor.

In some embodiments, each of the victim processor and the work-ready processors may be associated with a different processing unit in the plurality of processing units. In some embodiments, each of the victim processor and the work-ready processors may be associated with a different task executing on one of the plurality of processing units. In some embodiments, the work items may be different iterations of a parallel loop routine. In some embodiments, the plurality of processing units may include two or more of a first central processing unit (CPU), a graphics processing unit (GPU), and a digital signal processor (DSP). In some embodiments, the multi-processor computing device may be one of a heterogeneous multi-core computing device, a homogeneous multi-core computing device, or a distributed computing server.

In some embodiments, the method may further include acquiring, via the winning work-ready processor, control over a probabilistic lock for a shared data structure based on a calculated priority value of the winning work-ready processor, and updating, via the winning work-ready processor, the shared data structure to indicate the number of work items transferred to the winning work-ready processor in response to acquiring control over the probabilistic lock.

Further embodiments include a computing device configured with processor-executable instructions for performing operations of the methods described above. Further embodiments include a non-transitory processor-readable medium on which is stored processor-executable instructions configured to cause a computing device to perform operations of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the claims.

DETAILED DESCRIPTION

Figure 1:
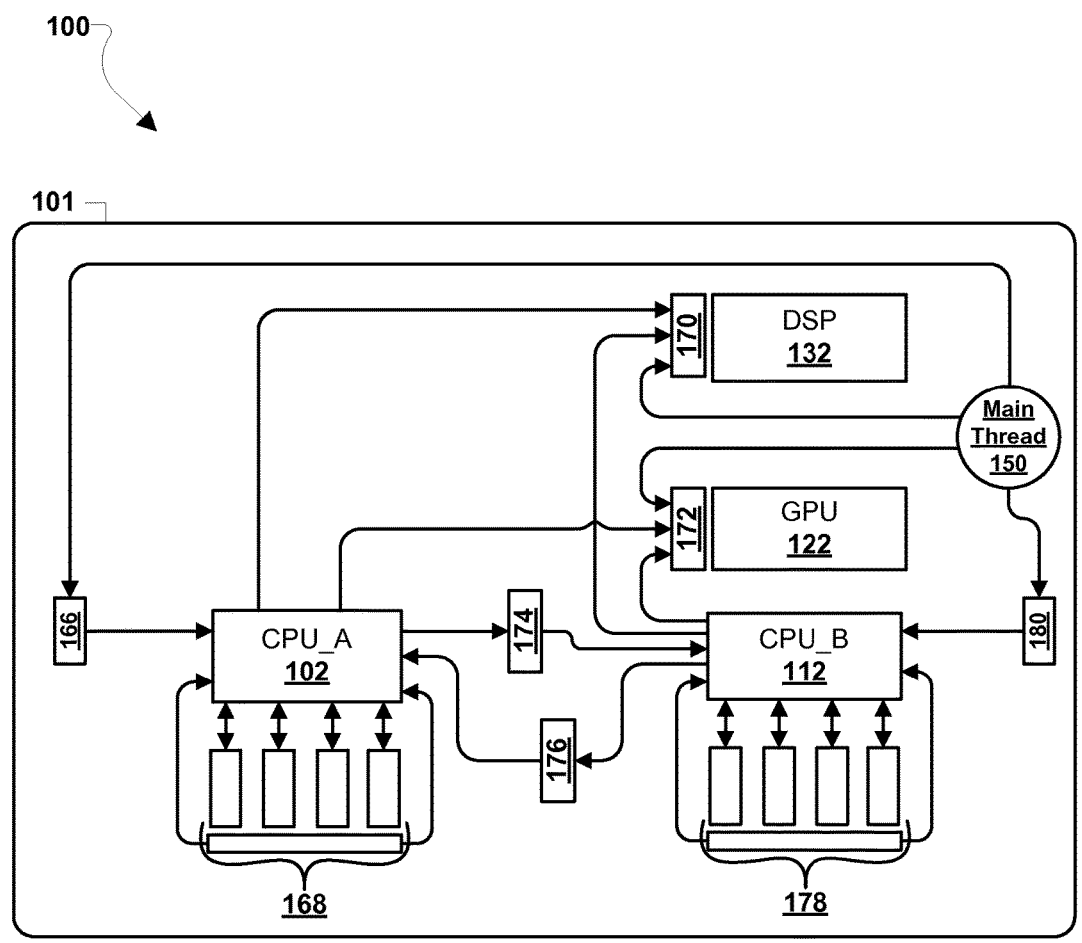
FIG. 1 is a component block diagram illustrating task queues and processing units of an exemplary heterogeneous multi-processor computing device (e.g., a heterogeneous system-on-chip (SoC)) suitable for use in some embodiments.

The various embodiments will be described in detail with reference to the accompanying drawings. Wherever possible, the same reference numbers are used throughout the drawings to refer to the same or like parts. References made to particular examples and implementations are for illustrative purposes, and are not intended to limit the scope of the embodiments or the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to an electronic device equipped with at least a multi-core processor. Examples of computing devices may include mobile devices (e.g., cellular telephones, wearable devices, smartphones, web-pads, tablet computers, Internet enabled cellular telephones, Wi-Fi® enabled electronic devices, personal data assistants (PDA's), laptop computers, etc.), personal computers, and server computing devices. In various embodiments, computing devices may be configured with various memory and/or data storage, as well as networking capabilities, such as network transceiver(s) and antenna(s) configured to establish a wide area network (WAN) connection (e.g., a cellular network connection, etc.) and/or a local area network (LAN) connection (e.g., a wired/wireless connection to the Internet via a Wi-Fi® router, etc.).

The terms "multi-processor computing device" and "multi-core computing device" are used herein to refer to computing devices configured with two or more processing units. Multi-processor computing devices may execute various operations (e.g., routines, functions, tasks, calculations, instruction sets, etc.) using two or more processing units. A "homogeneous multi-processor computing device" may be a multi-processor computing device (e.g., a system-on-chip (SoC)) with a plurality of the same type of processing unit, each configured to perform workloads. A "heterogeneous multi-processor computing device" may be a multi-processor computing device (e.g., a heterogeneous system-on-chip (SoC)) with different types of processing units that may each be configured to perform specialized and/or general-purpose workloads. Processing units of multi-processor computing devices may include various processor devices, a core, a plurality of cores, etc. For example, processing units of a heterogeneous multi-processor computing device may include an application processor(s) (e.g., a central processing unit (CPU)) and/or specialized processing devices, such as a graphics processing unit (GPU) and a digital signal processor (DSP), any of which may include one or more internal cores. As another example, a heterogeneous multi-processor computing device may include a mixed cluster of big and little cores (e.g., ARM big.LITTLE architecture, etc.) and various heterogeneous systems/devices (e.g., GPU, DSP, etc.).

The terms "work-ready processor" and "work-ready processors" are generally used herein to refer to processing units and/or a tasks executing on the processing units that are ready to receive one or more workloads via a work-stealing policy. For example, a "work-ready processor" may be a processing unit capable of receiving individual work items from other processing units or tasks executing on the other processing units. Similarly, the term "victim processor(s)" is generally used herein to refer to a processing unit and/or a task executing on the processing unit that has one or more workloads (e.g., individual work item(s), task(s), etc.) that may be transferred to one or more work-ready processors. The term "work-ready task" is used herein to refer to a work-ready processor that is a task executing on a processing unit. The term "work-ready processing unit" refers to a work-ready processor that is a processing unit. The term "victim task" is used herein to refer to a victim processor that is a task executing on a processing unit. The term "victim processing unit" refers to a victim processor that is a processing unit. However, such terms are not intended to limit any embodiments or claims to specific types of work-ready processor or victim processor.

In general, work stealing can be implemented in various ways, depending on the nature of the parallel processing computing system. For example, a shared memory multi-processor system may employ a shared data structure (e.g., a tree representation of the work sub-ranges) to represent the sub-division of work across the processing units. In such a system, stealing may require work-ready tasks to concurrently access and update the shared data structure via locks or atomic operations. As another example, a processing unit may utilize associated work-queues such that, when the queues are empty, the processing unit may steal work items from another processing unit and add the stolen work items the work queues of the first processing unit. In a similar manner, another processing unit may steal work items from the first processing unit's work-queues. Conventional work-stealing schemes are often rather simplistic, such as merely enabling one processing unit to share (or steal) an equally-subdivided range of a workload from a victim processing unit.

Traditionally, work-stealing has been assumed to be beneficial. However, in many situations, conventional work-stealing can result in counter-productive, sub-optimal results for computing devices executing under tight power and/or thermal constraints. For example, when a first task is ready to accept (or steal) work but is executing on a processor that is already close to a thermal limit, stealing too much work (e.g., too many iterations of a parallel loop task) may not be helpful to the overall performance of a shared workload. Some traditional work-stealing techniques may employ a "reactive" approach that looks only at immediate states without considering implications on near-future states of the computing system. For example, conventional ad hoc power management/thermal throttling may be used in a reactive manner to mitigate thermal issues in multi-processor systems. Further, some conventional work-stealing techniques often employ shallow "first-come, first-serve" schemes to award work items to a work-ready processor (e.g., the first processing unit to request or be ready to steal). Other techniques may use atomic operations to resolve data races between competing work-ready processors such that only one work-ready processor may succeed in taking over some work.

Such conventional work-stealing techniques fail to acknowledge that dynamic tasks scheduled on different, power-hungry processing units often encounter different power consumption and thermal states, which may affect the benefit achieved by transferring work among processors. For example, conventional power management techniques may have information gaps between runtime assessments of power and thermal conditions and data collected centrally at an operating system/architecture, making prioritization and load balancing suboptimal in parallel scheduling situations.

Various embodiments provide methods, devices, systems, and non-transitory process-readable storage media for using data from a task-based runtime system to improve data parallelism and load balancing in a multi-processor computing device (e.g., a heterogeneous system, etc.). In general, the multi-processor computing device may identify operating state data of different processing units executing tasks. The operating state data may include static device information and/or up-to-date measurements (e.g., temperature, frequency, power consumption) for the processing units. The multi-processor computing device may also maintain or otherwise calculate other information related to the operating conditions of the processing units, such as coefficients that indicate temperature, frequency, and/or power consumption levels of the processing units. With various operating state data, the multi-processor computing device may calculate priority values that may be used to enable comprehensive work-stealing decisions. For example, when work-ready processors are available to receive work items from a victim processor, the multi-processor computing device may use the calculated priorities of the various tasks to decide the most appropriate manner to redistribute work items. By assigning work based on at least current power consumption and thermal conditions, the multi-processor computing device may regulate the size of dynamic tasks in data parallel processing and proactively alleviate power consumption and hot spot issues.

In various embodiments, the multi-processor computing device may calculate a priority value for each processing unit (and/or associated task) using various types of measured or sampled data. In order to compare or make relative priorities between processing units, the multi-processor computing device may utilize operating state data specific to each processing unit (i.e., local data) as well as information that is applicable to all processing units (e.g., global data). In other words, the multi-processor computing device may utilize a global awareness of the states of all processing units to calculate priorities at a given time.

In various embodiments, the multi-processor computing device may utilize dynamically sampled data that may be used to prioritize tasks. For example, each processing unit executing a task may periodically provide to a runtime system (or scheduler) measurement data indicating current thermal output, power use (or power consumption rate), and/or operating frequency. Such data may be stored in a power profile for each processing unit (or an associated task).

In some embodiments, the multi-processor computing device may use a state query statement when a task begins execution on a processing unit in order to establish profiles or otherwise associate operating state data with processing units and/or tasks. Executing such a state query statement (e.g., an API call, etc.) may cause the processing unit to return data of a variety of local properties (e.g., frequency, leakage current, or active power). For example, when a task is dispatched to the DSP and ready to execute work items of a parallel loop routine (or workload), the multi-processor computing device may use a state query statement to tag the task with power consumption, frequency, and thermal operating state data for use in subsequent priority assessments.

In some embodiments, the multi-processor computing device may use a deterministic approach to calculate priority values and thus identify a work-ready processor that will receive work items from a victim processor. In particular, the multi-processor computing device may use various deterministic priority equations, such as schemes that emphasize different task properties (e.g., favoring the task with lower leakage power, or lower active power to maximize battery life, etc.). Such deterministic approaches may reduce communication overhead and may balance local power/thermal conditions by identifying work-ready processors that best balance work efficiency with other operating states of the system. In some embodiments, the multi-processor computing device may calculate a priority value for each individual processing unit for stealing work items using the following deterministic equation:

$$P_i = \alpha_i * f_i * \text{Temp}_i + \beta_i * g_i * \text{Power}_i + \gamma_i * h_i * \text{Freq}_i, \quad \text{Eq.1.}$$

In Equation 1, i represents an identity (or index) for a processing unit configured to execute dynamic tasks, $P_i$ represents an overall, stealing priority of the processing unit (relative to the stealing priorities of other processing units), $\alpha_i$ represents a global coefficient for temperature, $f_i$ represents a local coefficient for temperature (or temperature value) for the processing unit, $\text{Temp}_i$ represents a term/formula incorporating a local temperature measurement for the processing unit, $\beta_i$ represents a global coefficient for power consumption, $g_i$ represents a local coefficient for power consumption (or power consumption value) for the processing unit, $\text{Power}_i$ represents a term/formula incorporating a local power consumption measurement for the processing unit, $\gamma_i$ represents a global coefficient for frequency, $h_i$ represents a local coefficient for frequency (or compute rate) for the processing unit, and $\text{Freq}_i$ represents a term/formula incorporating a local frequency measurement for the processing unit. Larger numeric values generated using Equation 1 may indicate higher priorities.

The global coefficients of Equation 1 (i.e., $\alpha_i$, $\beta_i$, $\gamma_i$) may contribute in Equation 1 to uniformly balance the importance or impact of the local measurements (i.e., $\text{Temp}_i$, $\text{Power}_i$, $\text{Freq}_i$). Additionally for each aspect (e.g., temperature, power, and frequency), the global coefficients may allow differentiation between units i and j (e.g., by adjusting $\alpha_i$ vs. $\alpha_j$). In particular, the global coefficients may incorporate static characteristics of the processing units to differentiate between units. For example, the global coefficients may be generated to reflect static process technology variations (e.g., differing process used per core, such as big-LITTLE, differing leakage, frequency, etc.), packaging, and/or topology that may affect thermal dissipation (e.g., which cores can heat up or cool down quickly, etc.). As another example, the global coefficients may be generated to reflect workload-specific variations of processing units, such as temperature change rates due to various instruction-mixes and heterogeneity (e.g., CPU vs. DSP vs. GPU). As another example, the global coefficients may be generated to reflect system use (or system topology awareness), such as by providing data of components (e.g., a modem, etc.) that are busy and getting hot in order to de-prioritize related or nearby processing units. In some embodiments, the global coefficients may indicate whether processing units are suited for certain types of workloads (e.g., instructions for "big" architecture vs. "LITTLE" architecture, floating-point operations, etc.). In this way, the global coefficients may differentiate between processing units based on the characteristics of the parallel workload.

In some embodiments, a global scheduler may be configured to collect information across all processing units of the multi-processor computing device for comparisons that may adjust the global coefficient values. Further, the global coefficient values may incorporate comparisons across various processing units. For example, the multi-processor computing device may evaluate and/or incorporate relative factors between processing units in order to generate $\alpha_i$, $\beta_i$, $\gamma_i$ for each processor. For example, the multi-processor computing device may calculate that a very hot processor with index 'i' has a smaller compared a cooler processor with index 'j' (e.g., $\alpha_i < \alpha_j$).

In some embodiments, data used to generate the global coefficients may be obtained via periodic feedback from the processing units and/or from compile-time data indicating characteristics of to-be processed workloads. In some embodiments, the global coefficients may be set, adjusted, and/or otherwise determined offline (e.g., at manufacture, etc.), at boot-up of the multi-processor computing device, and/or periodically, such as via a global scheduler functionality (e.g., an OS-level thread, etc.).

The local coefficients of Equation 1 (i.e., $h_i$) may be coefficients determined based on estimations local to each processing unit (e.g., estimations typically done by a local scheduler for each processing unit). In particular, $h_i$ may be task-specific (or processing unit-specific) values generated by the multi-processor computing device based on data measured locally at the processing units. For example, the local coefficients may be based on the local properties of a certain processing unit and properties exhibited when the work items execute on that processing unit. The local coefficients (i.e., $h_i$) may be estimates of local processing unit properties over periods of time, such as average throughput observed over a number of prior work items, some estimations about observed temperature trends, and/or instruction-mix over a sequence of work items. In some embodiments, the local coefficients may be individually adjusted by a local scheduler functionality based only on data associated with each individual processing unit.

In some embodiments, the $f_i$ coefficient may be calculated to be a small value for certain processing units that are expected to heat up quickly based on the workload, such as if compute-bound, floating-point heavy work items execute on a CPU. Compile-time knowledge of the instruction-mix for the application code for a processing unit may provide such information. When work items are observed or expected to be similar as prior work items, the execution of the prior work items may help estimate a better $f_i$ for subsequent work items. The $g_i$ coefficient may be inversely proportional to an estimated energy per work item for a particular processing unit. For example, a first CPU core with a higher frequency may utilize more energy to process one work item compared to a second CPU core with a lower frequency, and thus the first CPU core may have a lower $g_i$ value, helping prioritize power-efficiency, if that is the desired goal. A local scheduler may compute $g_i$ based on estimated energy-per-work item over a recent sequence of work items at a processing unit (indexed 'i'), making $g_i$ tuned to be specific to characteristics of the work items. The $h_i$ coefficient may be proportional to a throughput of work items (or compute rate) on a particular processing unit. In some embodiments, the higher the $h_i$ coefficient value, the higher the calculated priority may be for a task or processing unit. In some embodiments, a GPU may be calculated to have a higher priority with regard to performance, but a DSP may be calculated to have a higher priority with regard to power-saving.

In various embodiments, the local coefficients ($f_i$, $g_i$, $h_i$) may represent "local" decisions by a local scheduler running on and using location information for each processing unit (e.g., on a processing unit with index 'i').

The local measurements in Equation 1 (i.e., $Temp_i$, $Power_i$, $Freq_i$) may be formulas over normalized measurements of the current operating conditions at individual processing units. In general, the local measurements (or per-core measured metrics) may allow faster adjustment than a local scheduler. The normalization may typically be with regard to some maximum temperature limit, power level or allowed frequency setting. In some embodiments, the priority of a processing unit (or task) may be lower when a local temperature is higher. For example, the overall priority calculation for a certain processing unit may be lower when the processing unit's measured temperature at a given time is higher. The local measurements of Equation 1 (i.e., $Temp_i$, $Power_i$, $Freq_i$) may be based on instantaneous measurements of various operating conditions.

In some embodiments, the local measurements may be generated using the following equations:

$$Temp_i = 1 - (T_i / ThermalLimit_i), \quad \text{Eq. 2}$$

where $T_i$ represents an estimated or measured temperature and $ThermalLimit_i$ represents a maximum temperature (or limit) at a processing unit with the index i;

$$Power_i = 1 - (P_i / PowerLimit_i), \quad \text{Eq. 3}$$

where $P_i$ represents an estimated or measured core power burn and $PowerLimit_i$ represents a maximum power consumption level (or limit) at a processing unit with the index i; and $$Freq_i = F_i / MaxFreq_i, \quad \text{Eq. 4}$$

where $F_i$ represents an estimated or measured frequency state and $MaxFreq_i$ represents a maximum frequency (or limit) at a processing unit with the index i. Regardless of how work items may have contributed to power consumption, $Power_i$ may be based on instantaneous power measurements of the processing unit (index 'i').

In some embodiments, the multi-processor computing device may utilize per-work item estimations when calculating priorities. For example, the multi-processor computing device may estimate a throughput per work item on particular processing units, in which a measured completion rate of a work item for each processing unit may be normalized to a maximum frequency for each processing unit. Per-work item throughput estimations may be valuable to overall priority calculations when evaluated work items are similar in execution time. Per-work item throughput estimations may also be valuable when work items are not similar, but the variations are spread evenly throughout the iteration-space of the work items. In some embodiments, such estimations may be performed by the local schedulers of processing units and may be reflected in local coefficient $h_i$.

In some embodiments, the multi-processor computing device may estimate an energy per work item on particular processing units. In such embodiments, an observed instruction mix (e.g., type(s) of instructions to be performed, amount of floating-point operations, etc.) may be identified at compile-time or runtime in order to estimate potential impacts on power consumption and/or temperature (e.g., more floating-point operations may increase thermal level faster, etc.).

In some embodiments, the multi-processor computing device may weigh or otherwise bias temperature, power consumption, and/or frequency measurements. For example, for a particular work-stealing decision, the multi-processor computing device may calculate priorities for a plurality of work-ready processors based on performance (e.g., frequency), but may not fully utilize data related to power consumption and/or temperatures related to the work-ready processors. In other words, priorities may be calculated using any combination and/or extent of the factors related to temperature, power consumption, and/or frequency. In some embodiments, the temperature, power consumption, and frequency factors may be highly correlated for particular processing units, allowing the use of only a subset of the factors to be adequate for calculating priority values.

In some embodiments, the multi-processor computing device may select work-ready processors for work-stealing ("winning" work-ready processors) using a probabilistic approach. In particular, the multi-processor computing device may utilize one or more "probabilistic locks" that may be accessed by work-ready processors based on corresponding priority values. In general, with some parallel processing implementations, the multi-processor computing device may utilize shared memory. In typical cases, locks may be employed to restrict access to certain data within the shared memory. In such cases, work-stealing protocols may utilize a shared work-stealing data structure to enable winning work-ready processors to directly steal work from a victim processor. The work-stealing data structure (e.g., a work-stealing tree data structure, etc.) may describe the processor that is responsible for what range of work items of a certain shared task (or computation).

In some embodiments, work-ready processors may contend in parallel to acquire a probabilistic lock on the shared data structure, typically with one winner processing unit succeeding and stealing at a time. Acquiring the probabilistic lock may be based on priorities of the competing work-ready processors. For example, the work-ready processor with the highest priority as calculated by the Equation 1 above may have a higher probability of acquiring the lock over other work-ready processors with lower priority values. In other words, two work-ready processing units (e.g., processing unit with index "i" and another processing unit with index "j") that are simultaneously contending for a probabilistic lock may have a probability of acquiring the probabilistic lock determined by priorities P and P respectively. The work-ready processor that acquires the probabilistic lock may have exclusive access to examine and modify data within the shared work-stealing data structure, such as by updating the data of the work-stealing data structure to reflect the work-ready processor that is stealing work from a victim processor, as well as how many work items are being stolen. When the probabilistic lock is released, additional work-ready processors may receive a chance to acquire the probabilistic lock. Although probabilistic lock embodiments may effectively create a competition or "race" between work-ready processors, the corresponding embodiment techniques may not be reactive as priorities are calculated based on global and local coefficients and do not depend on particular work-stealing frameworks.

In some embodiments, acquiring the probabilistic lock may include a processing unit using (or calling) a function that accepts the processing unit's calculated priority value (e.g., $P_i$). In some embodiments, the rate at which a processing unit may retry acquiring a probabilistic lock may be based on a priority value. For example, a processing unit 'i' may be allowed to call a lock-acquiring function at an interval based on a priority $P_i$.

In some embodiments, workload distribution decisions by the multi-processor computing device may be two-fold; a first decision to determine a winning work-ready processor, and a second decision to determine how much work to distribute to the winning work-ready processor. When a winning work-ready processor is determined, the multi-processor computing device may decide the amount of work (or how many work items) that is to be re-assigned and transferred to the winning work-ready processor based on relative priorities of the winning work-ready processor and the victim processor. For example, the multi-processor computing device may determine a percentage or split of work between a victim task and a winning work-ready task based on relative power/thermal states at the time the decision is made. In some embodiments, the multi-processor computing device may calculate a priority for the victim processor and the winning work-ready processor to identify the number or percentage of available work items that may be stolen/kept. For example, based on priority values calculated using an equation as described herein, the multi-processor computing device may determine that the victim task should keep most of a set of available work items due to the winning task having only a marginal priority over the victim task based on the relative speeds of the two tasks.

In some embodiments, the multi-processor computing device may use the following equations to calculate a work item allocation between a victim processor and a winning work-ready processor:

$$N_i = K*(P_i/(P_i+P_j));  \quad \text{Eq. 5}$$

$$N_j = K - N_i,  \quad \text{Eq. 6}$$

In Equations 6 and 7, i represents a first task index (or ID), j represents a second task index (or ID), $N_i$ represents the number of work items to be awarded to the first task, $N_j$ represents the number of work items to be awarded to the second task, K represents a total number of work items remaining to be processed by the victim processor prior to stealing, $P_j$ represents a priority of the second task, and $P_i$ represents a priority of the first task. In various embodiments, the number of work items stolen by a work-ready processor may be in proportion to priorities calculated via Equation 1.

As a non-limiting illustration using exemplary Equations 8-10, a victim processor (i.e., processing unit or task with index i) and a work-ready processor (i.e., processing unit or task with index j) may be configured to execute work items for a parallel loop routine. At a given time, the work-ready processor may be identified as a winning work-ready processor over other work-ready processors ready to receive work items from the victim processor. At that time, there may be 10 iterations (i.e., K work items=10) remaining to be processed by the victim processor for the parallel loop routine. Further, the victim processor may be tagged with a first priority ($P_i=1$), and the winning work-ready processor may be tagged with a second priority ($P_j=2$). As a result, the multi-processor computing device may calculate that the victim processor may keep ~3 iterations of the parallel loop routine (i.e., via Equation 5, $N_i=\sim3.33=10*(1/(1+2))$); and that the winning work-ready processor may be allocated ~7 iterations of the parallel loop routine (i.e., via Equation 6, $N_j=\sim6.67=10-3.33$).

In some embodiments, a plurality of work-ready processors may be allocated work items from a victim processor. In such a case, the multi-processor computing device may utilize a similar approach to determine percentages of allocations as described herein with reference to Equations 5-6. In some embodiments, the multi-processor computing device may collectively examine a number of work-ready tasks in a work-ready queue and distribute stolen work items across multiple work-ready tasks in proportion to respective priorities.

In some embodiments, the multi-processor computing device may be configured to assign more work items to a slower processing unit and/or task (e.g., a more energy-efficient winner work-ready processor, such as a DSP). In such settings, the slower energy-efficient processor would be assigned a higher priority than faster processors due to having larger $\beta_i$ or $g_i$ coefficients. In this way, processing units and/or tasks with lower power leakage or lower active power may be favored in order to maximize battery life, with the energy-efficiency policy being implemented simply by an appropriate choice of the global and/or local coefficient values across the different processing units.

In various embodiments, the multi-processor computing device may execute one or more runtime functionalities (e.g., a runtime service, routine, thread, or other software element, etc.) to perform various operations for scheduling or dispatching tasks. Such one or more functionalities may be generally referred to herein as a "runtime functionality." The runtime functionality may be executed by a processing unit of the multi-processor computing device, such as a general purpose or applications processor configured to execute operating systems, services, and/or other system-relevant software. For example, a runtime functionality executing on an application processor may be configured to calculate priorities of tasks running on one or more processing units. Other runtime functionalities may also be used, such as dedicated functionalities for handling tasks at individual processing units.

The processing units of the multi-processor computing device may be configured to execute one or more tasks that each may be associated with one or more work items. Some tasks may be configured to participate in common data parallel processing efforts. For example, a GPU may be configured to perform a certain task for processing a set of work items (or iterations) of a parallel loop routine (or workload) also shared by a DSP and a CPU. However, although the embodiment techniques described herein may be clearly used by the multi-processor computing device to improve such common data parallel processing workloads on a plurality of processing units, any workloads capable of being shared on various processing units may be improved with the embodiment techniques. For example, work-stealing policies based on priority calculations as described herein may be used for improving the multi-processor computing device's overall performance of multi-versioned tasks and/or general-purpose calculations that may be discretely performed on a plurality of processing units.

Work-ready processors may be determined as "work-ready" (i.e., ready to steal work items from a victim processor) in various ways. In some embodiments, the multi-processor computing device may be configured to continually (or periodically) identify processing units and associated tasks that are ready to receive work items from other processing units (i.e., work-ready processors). The identification of work-ready processors may be accomplished in various manners, such as detecting application programming interface (API) calls from a processing unit to a runtime functionality indicating readiness to steal, setting a system variable associated with a processing unit, entering a processing unit's identifier in a general work stealing list, sending interrupts, etc. In some other embodiments that utilize shared memory, each processing unit of the multi-processor computing device may independently realize a respective work-ready status (e.g., when a processing unit detects there are no more originally-assigned work items) and may concurrently perform operations to access a shared work-stealing data structure to steal work items as described herein (e.g., acquire a probabilistic lock, etc.).

For simplicity, references may be made to "work-ready processor queues" that may be listings of work-ready processors identified as ready to receive work items from task queues. Such a work-ready processor queue or other data structure may be associated with a particular processing unit in the multi-processor computing device, and may be updated as work-ready processors are awarded work items. For example, data related to a winning work-ready task may be popped, dequeued, or otherwise removed from a work-ready processor queue when there is a successful transfer from a task queue. As shown with reference to FIGS. 2A-2D, a work-ready processor queue may be a data structure (e.g., an array, queue, linked list, etc.) stored in memory that may be used to track identifying data for any processing units (or associated tasks) that are available to receive work items from another processing unit.

However, references to such work-ready processor queues are not intended to limit the embodiments or claims to any particular implementation for identifying and/or otherwise managing one or more ready work-ready tasks. For example, in a shared-memory environment, processing units may simply compete for access to work-stealing data structures. In some embodiments, a runtime functionality may be configured to manage work-ready processor queues and/or any other similar mechanism for identifying work-ready tasks ready to receive work items from any particular processing unit. For example, instead of using work-ready processor queues, processing units may utilize various data structures, data containers, and/or other stored data to manage a collection of consecutive work items (e.g., iterations in a loop).

The embodiment techniques tag or otherwise assess the operating states (e.g., power consumption, frequency, temperature) for dynamic tasks in order to determine workload distributions and proactively balance power consumption and thermal dissipation in multi-processor systems (e.g., mobile devices using ARM's big.LITTLE architecture). These improvements work to fill a gap between parallel program execution and architecture/OS-level power and thermal management, and thus provide work-stealing solutions that also balance power consumption, thermal dissipation, and other operating parameters. Various embodiment techniques (e.g., via a central authority or runtime system) may use data regarding power consumption, frequency, and thermal states of the various tasks/processing units to proactively balance workload distribution. The embodiment techniques calculate fine-grained, comprehensive priorities that include both local values, global values utilizing state information from across the processing units, and local measurements at a given time, such as via local schedulers with local core data (e.g., metrics, sampled data).

Some conventional thermal management schemes take actions to mitigate thermal conditions in response to detecting unacceptable temperatures (e.g., temperatures exceeding predefined thresholds). The embodiment techniques prevent thermal issues prior to encountering unacceptable conditions due to the work-stealing techniques that use temperature (and other operating state data) of processing units and/or tasks to identify where work items may be processed. Further, conventional techniques may utilize pre-defined priorities for various tasks or operations. The embodiment techniques utilize fine-grained data about any arbitrary tasks to identify relative priorities based on dynamic operating states of the tasks.

Thus, the various embodiments provide proactive task management techniques to effectively trade-off performance and power through work-stealing techniques in multi-core processor computing devices. Various embodiments provide intelligent methods for selecting work-ready processors to receive work items from a victim processor in order to achieve overall load-balancing in a manner that considers execution speed, temperature and/or power states of the various processors.

Various embodiments may use global state information from across the processing units and local information on each processing unit to make more intelligent work-stealing decisions. Such embodiment techniques may be employed to improve performance due to load imbalances in different computing systems capable of implementing various work-stealing techniques. For example, embodiment methods may be used to improve performance in heterogeneous multi-core computing devices, homogeneous multi-core computing devices, servers or systems configured for distributed processing (e.g., a distributed computing server), etc. The various embodiment techniques are not specific to any type of parallelization system and/or implementation, but instead provide a manner of adding priorities to various work-stealing decisions, regardless of how runtimes may implement work-stealing. Therefore, reference to any particular type or structure of multi-processor computing device (e.g., heterogeneous multi-processor computing device, etc.) and/or general work-stealing implementation described herein is merely used for simplicity and is not intended to limit the embodiments or claims.

FIG. 1 is a diagram 100 illustrating various components of an exemplary heterogeneous multi-processor computing device 101 suitable for use with various embodiments. The heterogeneous multi-processor computing device 101 may include a plurality of processing units, such as a first CPU 102 (referred to as "CPU_A" 102 in FIG. 1), a second CPU 112 (referred to as "CPU_B" 112 in FIG. 1), a GPU 122, and a DSP 132. In some embodiments, the heterogeneous multi-processor computing device 101 may utilize an "ARM big.Little" architecture, and the first CPU 102 may be a "big" processing unit having relatively high performance capabilities but also relatively high power requirements, and the second CPU 112 may be a "little" processing unit having relatively low performance capabilities but also relatively low power requirements compared to the first CPU 102.

The heterogeneous multi-processor computing device 101 may be configured to support parallel-processing, "work sharing", and/or "work stealing" between the various processing units 102, 112, 122, 132. In particular, any combination of the processing units 102, 112, 122, 132 may be configured to create and/or receive discrete tasks for execution.

Each of the processing units 102, 112, 122, 132 may utilize one or more queues (or task queues) for temporarily storing and organizing tasks (and/or data associated with tasks) to be executed by the processing units 102, 112, 122, 132. For example, the first CPU 102 may retrieve tasks and/or task data from task queues 166, 168, 176 for local execution by the first CPU 102 and may place tasks and/or task data in queues 170, 172, 174 for execution by other devices. The second CPU 112 may retrieve tasks and/or task data from queues 174, 178, 180 for local execution by the second CPU 112 and may place tasks and/or task data in queues 170, 172, 176 for execution by other devices. The GPU 122 may retrieve tasks and/or task data from queue 172. The DSP 132 may retrieve tasks and/or task data from queue 170. In some embodiments, some task queues 170, 172, 174, 176 may be so-called multi-producer, multi-consumer queues, and some task queues 166, 168, 178, 180 may be so-called single-producer, multi-consumer queues. In some embodiments, tasks may be generated based on indicators within code, such as designations by programmers of workloads that split certain computations.

In some embodiments, a runtime functionality (e.g., runtime engine, task scheduler, etc.) may be configured to determine destinations for dispatching tasks to the processing units 102, 112, 122, 132. For example, in response to identifying a new general-purpose task that may be offloaded to any of the processing units 102, 112, 122, 132, the runtime functionality may identify a processing unit suitable for executing the task and may dispatch the task accordingly. Such a runtime functionality may be executed on an application processor or main processor, such as the first CPU 102. In some embodiments, the runtime functionality may be performed via one or more operating system-enabled threads (e.g., "main thread" 150). For example, based on determinations of the runtime functionality, the main thread 150 may provide task data to various task queues 166, 170, 172, 180.

FIGS. 2A-2D illustrate non-limiting examples of work-stealing operations by a heterogeneous multi-processor computing device 101 according to various embodiments. As described with reference to FIG. 1, the heterogeneous multi-processor computing device 101 may include a plurality of processing units, including a first CPU 102 (i.e., CPU_A in FIGS. 2A-2D), a second CPU 112 (i.e., CPU_B in FIGS. 2A-2D), a GPU 122, and a DSP 132. Each of the processing units 102, 112, 122, 132 may be associated with a task queue 220a-220d for managing tasks and related data (e.g., work items). For example, the first CPU 102 may be associated with a first task queue 220a, the second CPU 112 may be associated with a second task queue 220b, the GPU 122 may be associated with a third task queue 220c, and the DSP 132 may be associated with a fourth task queue 220d.

Each of the processing units 102, 112, 122, 132 may also be associated with a work-ready processor queue 240a-240d for managing tasks and related data. For example, the first CPU 102 may be associated with a first work-ready processor queue 240a, the second CPU 112 may be associated with a second work-ready processor queue 240b, the GPU 122 may be associated with a third work-ready processor queue 240c, and the DSP 132 may be associated with a fourth work-ready processor queue 240d.

Each of the work-ready processor queues 240a-240d may be used to indicate the identities of processing units (and/or related tasks) that are currently waiting to receive work items from particular task queues. For example, processing unit identities (or indices) within the first work-ready processor queue 240a may indicate that the processing units that are currently waiting/contending to receive works items from the first task queue 220a associated with the first CPU 102.

In some embodiments, the work-ready processor queues 240a-240d may be stored within various data sources or structures (e.g., system variables, arrays, etc.) that may or may not be directly associated with the individual processing units 102, 112, 122, 132. For example, the work-ready processor queues 240a-240d may be represented by the same queue-type data structure that is used for organizing any processing unit or task currently ready to receive work items from other tasks. In some embodiments, the task queues 220a-220d and/or the work-ready processor queues 240a-240d may be discrete components (e.g., memory units) corresponding to the processing units 102, 112, 122, 132 and/or ranges of memory within various memory units (e.g., system memory, shared memory, virtual memory, etc.).

In some embodiments, the heterogeneous multi-processor computing device 101 may include a runtime functionality module 210, such as an operating system (OS) level process, service, application, routine, instruction set, or thread that executes via an application processor (e.g., CPU_A 102). The runtime functionality module 210 may be configured to at least perform operations for managing work-stealing policies within the heterogeneous multi-processor computing device 101. For example, the runtime functionality module 210 may be configured to add and/or remove identifiers from the work-ready processor queues 240a-240d in response to determining tasks queues 220a-220d are empty, as well as perform operations for evaluating operating states and determining relative priorities between processing units and/or associated tasks.

Figure 2A:
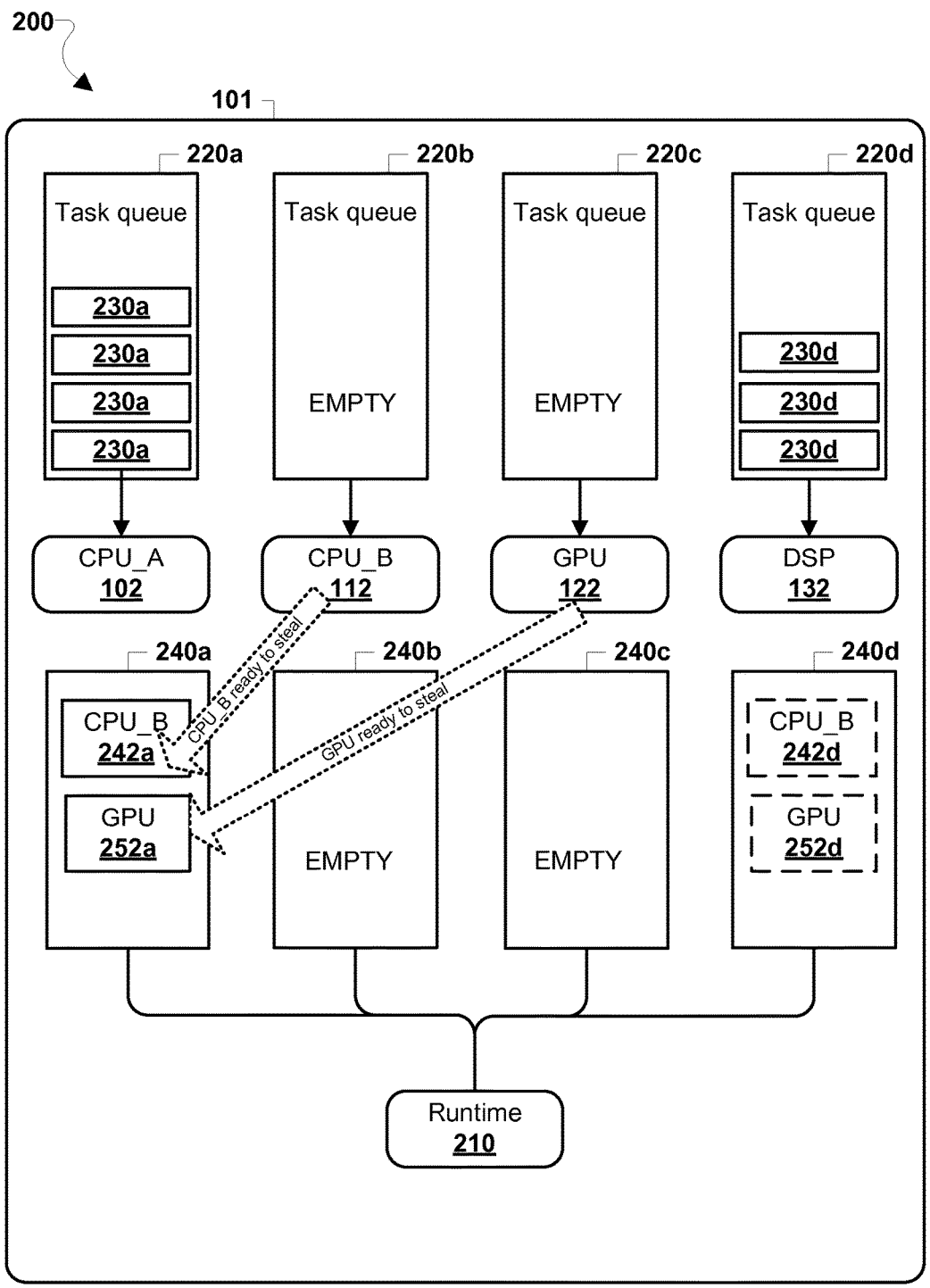
FIGS. 2A-2D are component block diagrams illustrating exemplary work-stealing operations by a multi-processor computing device according to some embodiments.

FIG. 2A shows a diagram 200 illustrating exemplary work-stealing operations in the heterogeneous multi-processor computing device 101. At an arbitrary first time, the task queue 220a for the first CPU 102 has a plurality of work items 230a and the task queue 220d for the DSP 132 has a plurality of work items 230d. However, both the second CPU 112 (i.e., CPU_B in FIGS. 2A-2D) and the GPU 122 have no work items within respective task queues 220b, 220c, thus making the second CPU 112 and the GPU 122 ready (or eligible) to receive work items from other processing units. For example, when the processing units 102, 112, 122, 132 each were assigned work items for processing iterations of a parallel loop routine, the second CPU 112 and the GPU 122 may have already completed assigned iterations and may be ready to receive iterations from the first CPU 102 and/or the DSP 132. Upon becoming ready to receive work items from other processing units, data identifying the second CPU 112 and the GPU 122 may be entered into the work-ready processor queues of other processing units that have work items waiting to be processed. For example, identifying data for the second CPU 112 (i.e., data 242a) and identifying data for the GPU 122 (i.e., data 252a) may be placed in the work-ready processor queue 240a of the first CPU 102.

In various embodiments, work-ready processors ready to receive work items may contend to receive work items from one of a plurality of task queues of processing units of a system. In other words, there may be more than one potential victim processor at a given time. For example, instead of competing to receive work items from the task queue 220*a* of the first CPU 102, the second CPU 112 and the GPU may instead compete to receive work items from the task queue 220*d* of the DSP 132 by being entered in the work processor queue 240*d* of the DSP 132. As another example, instead of competing to receive work items from the task queue 220*a* of the first CPU 102, the second CPU 112 may be entered in the work-ready processor queue 240*a* of the first CPU 102 and the GPU 122 may be entered in the work-ready processor queue 240*d* of the DSP 132. However, in various embodiments, a work-ready processor may only compete in one work-ready processor queue at any given time. Further, in various embodiments, the results of a competition between a plurality of work-ready processor to receive work items from a task queue of a victim processor may not affect the results of subsequent competitions for the same victim processor and/or other victim processors. For example, if the second CPU 112 is awarded work items 230*a* from the first task queue 220*a* over the GPU 122 at a first time, the second CPU 122 may not necessarily be assigned work items 230*d* from the fourth task queue 220*d* over the GPU 122 at a second time.

Figure 2B:
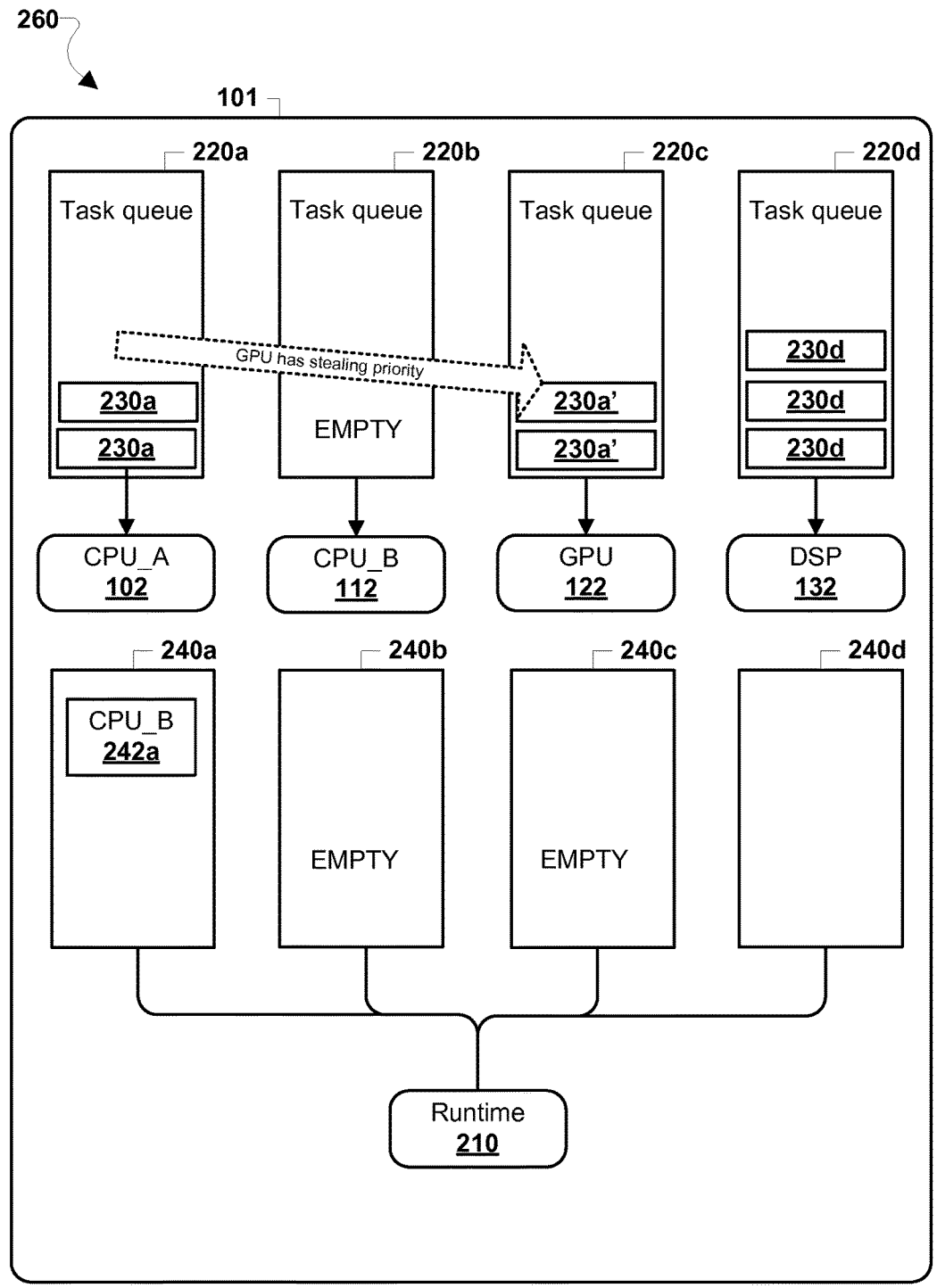

FIG. 2B shows a diagram 260 illustrating an example of work-stealing operations at a second time after the first time of FIG. 2A. At the second time, the runtime functionality module 210 may transfer work items 230*a'* from the task queue 220*a* of the first CPU 102 to the task queue 220*c* of the GPU 122 based on priority calculations as described herein (e.g., based on temperature, power consumption, and/or frequency). For example, in response to detecting that the second CPU 112 and the GPU 122 are both ready to receive from the first CPU 102 (i.e., identifying data 242*a*, 252*a* in the first work-ready processor queue 240*a*), the runtime functionality module 210 may calculate a relative priority between the second CPU 112 and the GPU 122 that addresses (or is based at least partly upon) the temperature, power consumption, and/or frequency for each processing unit 112, 122. The runtime functionality module 210 may determine that the GPU 122 is the winning work-ready processor over the second CPU 112 based on a higher priority value for the GPU 122 at the second time. Thus in the illustrated example, as the second CPU 112 is calculated to have a lower priority for stealing purposes, no work items may be transferred to the task queue 220*b* of the second CPU 112 at the second time. However, due to the dynamic nature of the stealing priority calculations, it is possible that the second CPU 112 may have a higher stealing priority than the GPU 122 at other times.

Once the GPU 122 is determined the winning work-ready processor, the runtime functionality module 210 may also make a determination as to the amount of work to be reassigned to the GPU 122. For example, the runtime functionality module 210 may also calculate relative priorities of the first CPU 102 and the GPU 122 as described herein. Based on these relative priorities, the runtime functionality module 210 may determine that two of the original four pending work items 230*a* in the task queue 220*a* of the first CPU 102 may be transferred to the task queue 220*c* of the GPU 122.

After the transfer (or reassignment) of work items, the runtime functionality module 210 may remove the identifying data 252*a* associated with the winning work-ready processor (i.e., the GPU 122) from the work-ready processor queue 240*a* of the first CPU 102. In some embodiments, the runtime functionality module 210 may remove all identifying data associated with the winning work-ready processor from all work-ready processor queues 240*a*, 240*d* in response to transferring work items 230*a'*. In some embodiments, all identifying data 242*a*, 252*a*, 242*d*, 252*d* for any competing work-ready processors may be removed from work-ready processor queues 240*a*, 240*d* in response to awarding work items to a winning work-ready processor, thus forcing ready work-ready processors to reassert readiness to receive work items. For example, after the GPU 122 wins the work items 230*a'* based on priority calculations by the runtime functionality module 210, the second CPU 112 may enter new identifying data 242*a*, 242*d* into the work-ready processor queues 240*a*, 240*d* of processing units 102, 132 having available work items to steal.

Figure 2C:
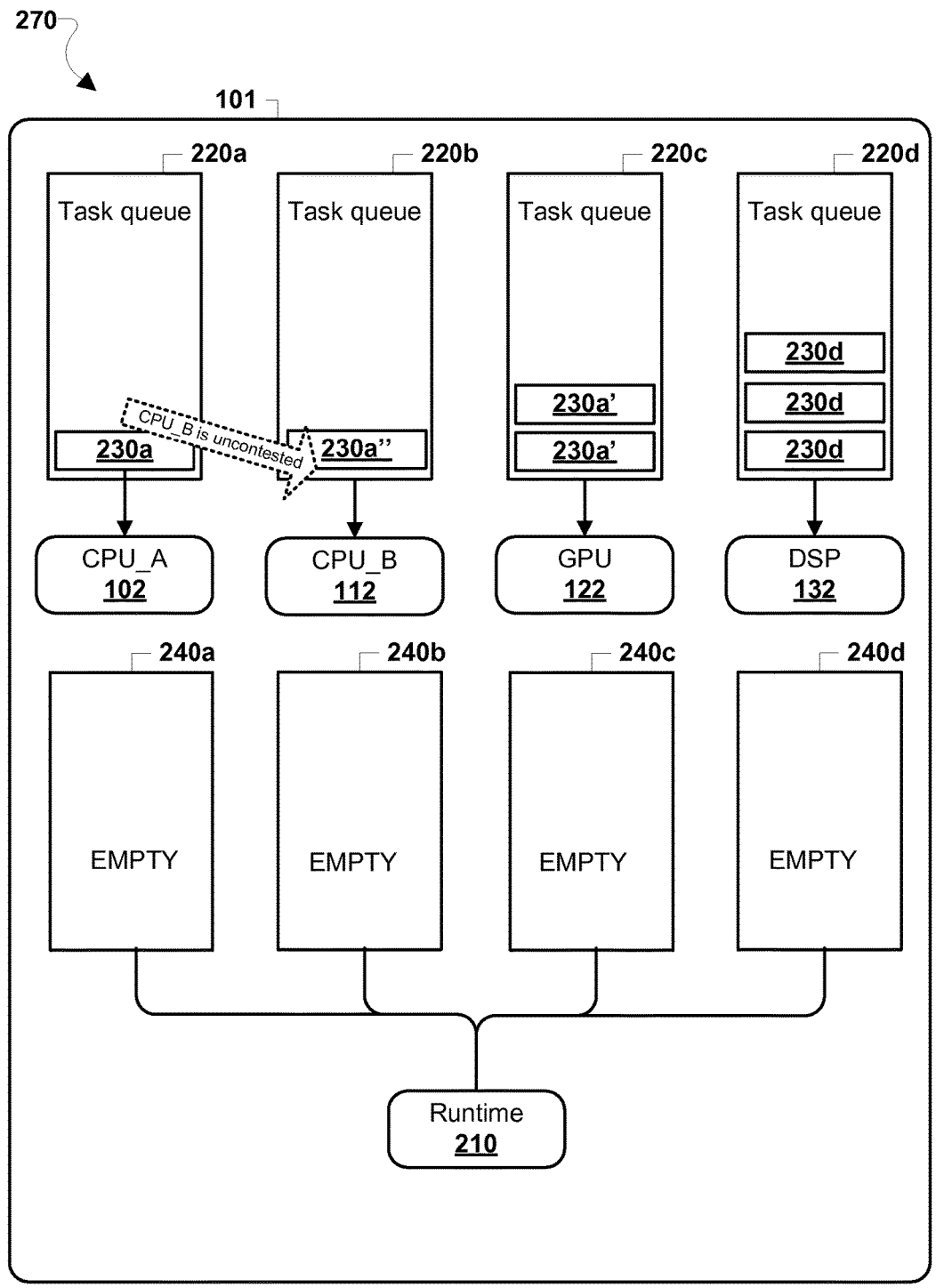

FIG. 2C shows a diagram 270 illustrating exemplary work-stealing operations at a third time after the second time of FIG. 2B. At the third time, the runtime functionality module 210 may transfer work items 230*a"* from the task queue 220*a* of the first CPU 102 to the second CPU 112. In other words, after a first award of work items 230*a'* to the GPU 122, the runtime functionality module 210 may perform subsequent work-stealing calculations to determine whether remaining work-ready processors in the work-ready processor queues 240*a*, 240*d* may also be awarded work items. For example, in response to detecting identifying data 242*a* of the second CPU 112 in the work-ready processor queue 240*a* of the first CPU 102, the runtime functionality module 210 may calculate relative priorities of the processing units 102, 112 to determine that the uncontested second CPU 112 may receive a work item 230*a"*.

Figure 2D:
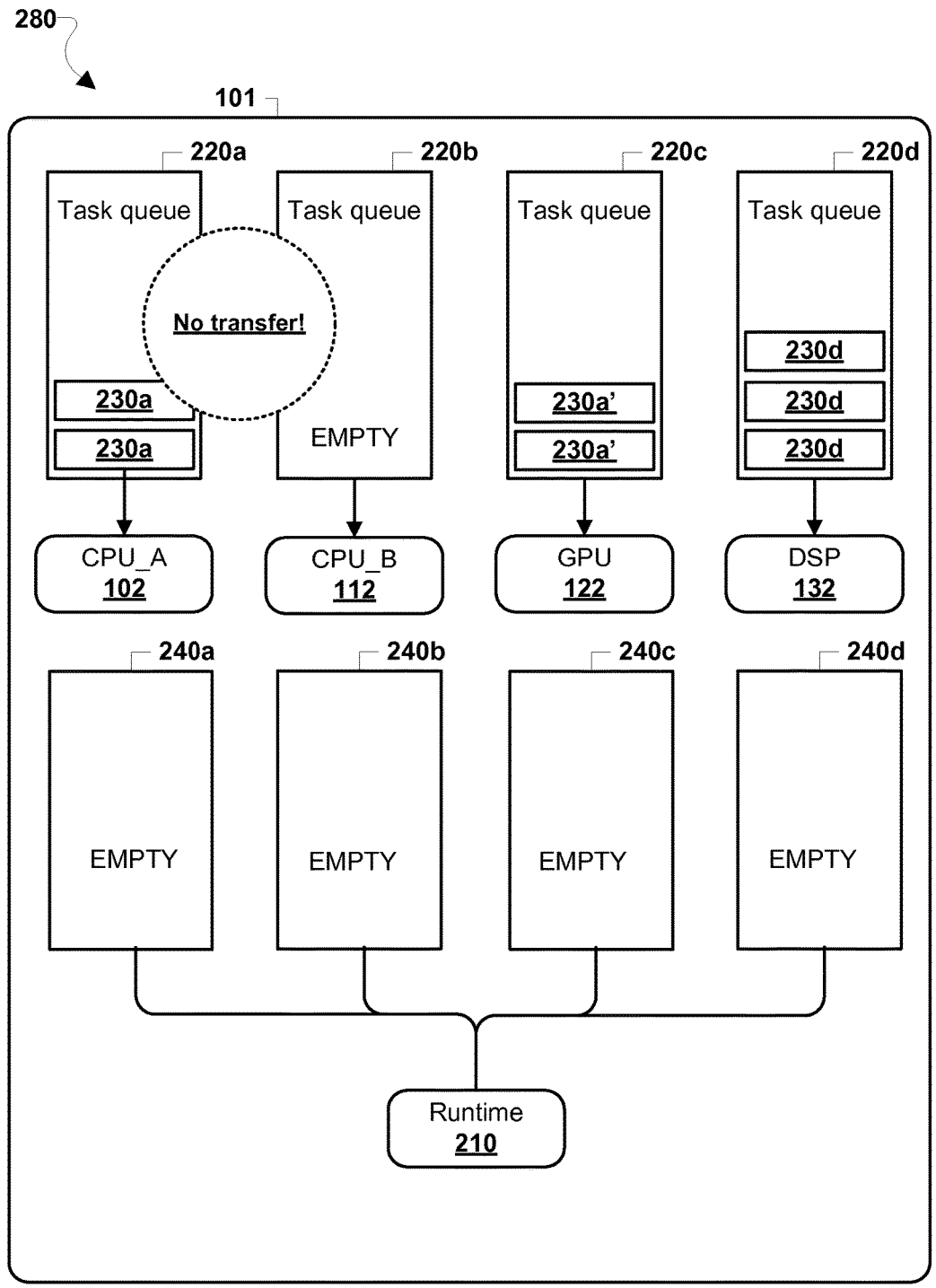

FIG. 2D shows a diagram 280 illustrating an alternative conclusion to the work-stealing operations at the third time in which the runtime functionality module 210 may not award any work items 230*a* from the task queue 220*a* of the first CPU 102 to the second CPU 112 based on priority calculations. For example, the runtime functionality module 210 may perform priority calculations based on power consumption, temperature, and/or frequency and determine a ratio for reallocating work items 230*a* that provides no work items to the second CPU 112. In this case, based on priority, the second CPU 112 may have had a lower probability of winning work items 230*a* from the first CPU 102. Thus, the runtime functionality module 210 may refuse to transfer work items 230*a* to the second CPU 112. For example, based on a high current temperature at the second CPU 112, the runtime functionality module 210 may determine that first CPU 102 is a better option over the second CPU 112 for finishing the work items 230*a* remaining in the task queue 220*a*.

Figure 3:
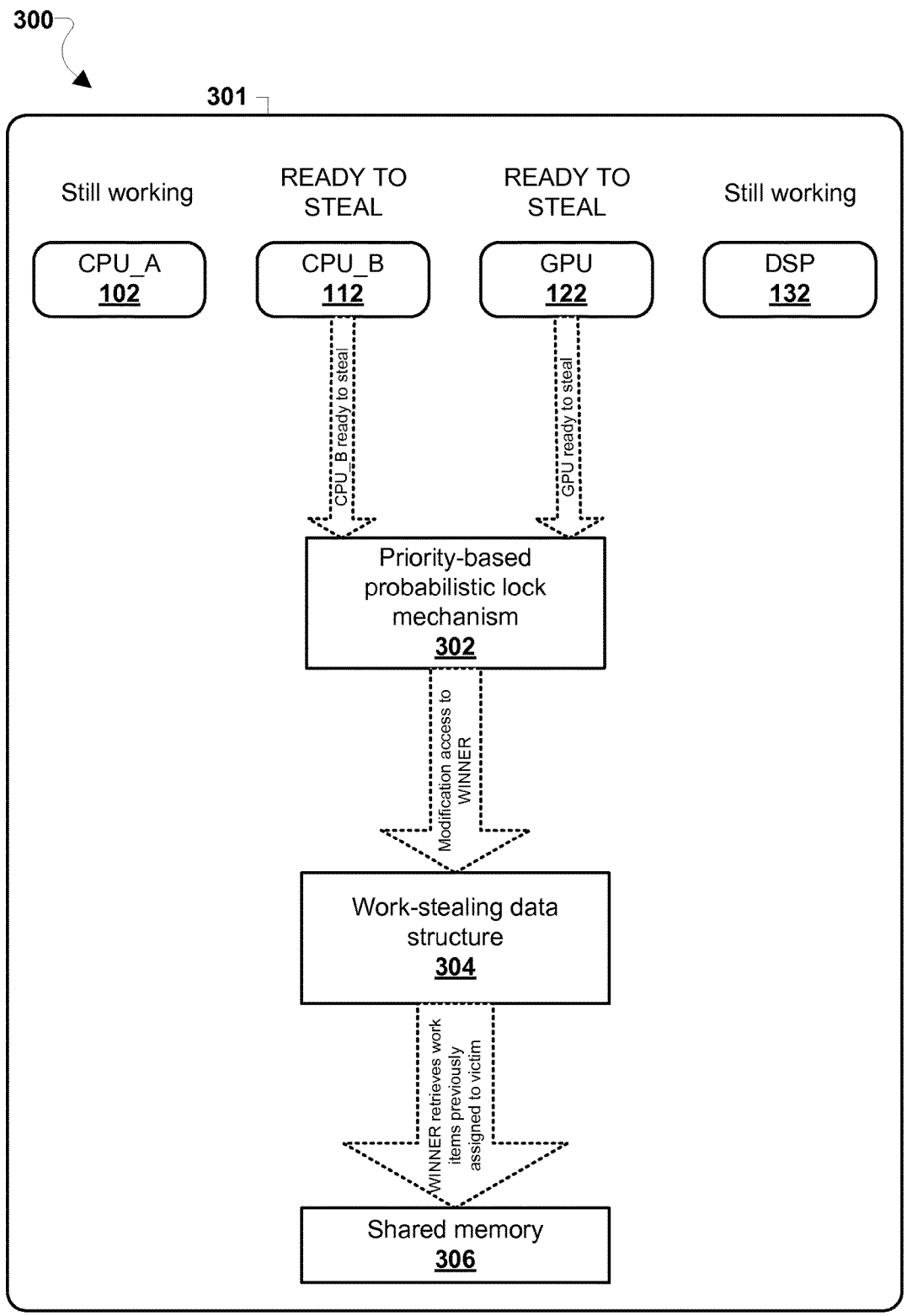
FIG. 3 is a component block diagram illustrating exemplary work-stealing operations by a multi-processor computing device having a shared memory and work-stealing data structure according to some embodiments.

Different work-stealing implementations may benefit from the embodiment priority calculations as described. For example, some computing environments that use queues (e.g., as shown in FIGS. 2A-2D) may employ embodiment techniques for calculating work-ready processor priorities and associated allocations of work items from task queues. As another example, in a shared-memory environment, a multi-processor computing device may be configured to manage the reallocation of parallel processing workloads using a work-stealing data structure that corresponds to work items associated with various segments of the shared memory. FIG. 3 illustrates example work-stealing operations by a multi-processor computing device 301 having a shared memory 306 and work-stealing data structure 304 according to some embodiments. Unlike the example system illustrated in FIGS. 2A-2D, the multi-processor computing device 301 of FIG. 3 may be a high-performance implementation of work-stealing that does not use queues, but instead uses the shared work-stealing data structure 304 that controls access to various work items of a shared task.

As shown in FIG. 3, whenever processing units complete assigned workloads for the shared task, the processing units may become ready to steal from the other processing units (e.g., become work-ready processors). For example, both the second CPU 112 and GPU 122 may independently determine themselves to be "ready to steal". The second CPU 112 and the GPU 122 may then compete (or race) to steal work items from either the first CPU 102 or the DSP 132, which are still processing original work items of the shared task. In some embodiments, both the second CPU 112 and the GPU 122 may compete to acquire control over the work-stealing data structure 304 via a priority-based probabilistic lock mechanism 302. The probability of either processing unit 112, 122 gaining control over the priority-based probabilistic lock mechanism 302 may depend on the respective priority values (e.g., values calculated via Equation 1 as described). The one processing unit to gain control over the probabilistic lock may thus gain modification access to the work-stealing data structure 304 as the "winning work-ready processor." With access to update or otherwise change the data within the work-stealing data structure 304, the winning work-ready processor may reassign work items from other processing units (e.g., first CPU 102, DSP 132) and then retrieve work items directly from the shared memory 306.

Figure 4A:
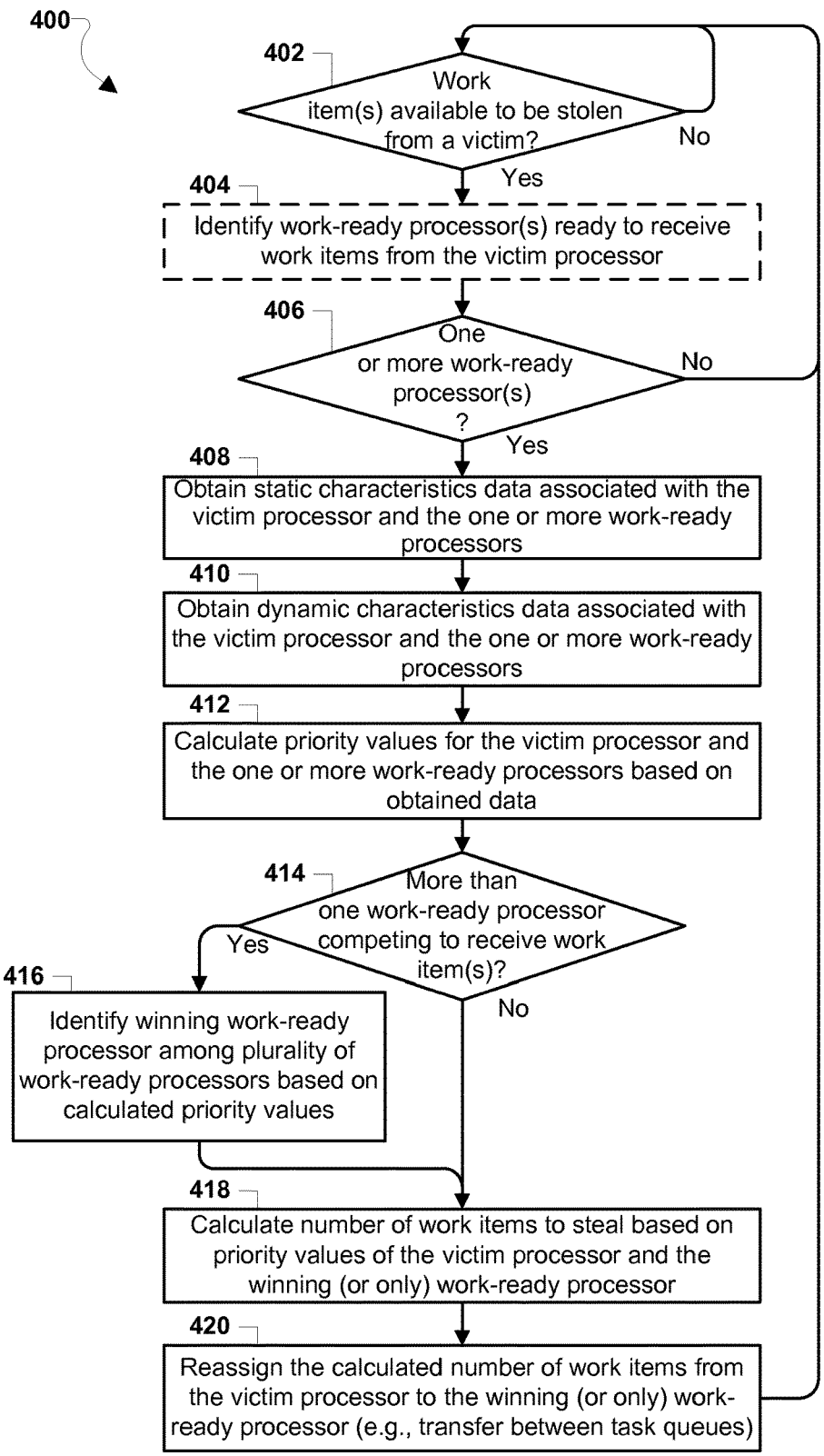
FIGS. 4A-4B is a process flow diagram illustrating an embodiment method performed by a multi-processor computing device to proactively balance workloads between a plurality of processing units by making work-stealing determinations based on operating state data.

FIG. 4A illustrates a method 400 for proactively balancing workloads between a plurality of processing units by making work-stealing determinations based on operating state data. As described, a multi-processor computing device (e.g., multi-processor computing device 101, 301 in FIGS. 1-2D, 3) may be configured to enable improved work-stealing by calculating priorities of work-ready processors and victim processors with respect to power consumption, temperature, and/or frequency operating state data. Once one or more work-ready processors are identified as ready for stealing work items from a victim processor, the multi-processor computing device may calculate priorities by evaluating static characteristics of the processing units involved (e.g., processing units of work-ready tasks, processing unit of a victim task) and dynamic operating conditions of the processing units. Such comprehensive priority values may be used to determine relative rankings between work-ready processors as well as work item distributions to a winning work-ready processor. In this way, the multi-processor computing device may employ fine-grained operating data about different processing units and associated tasks to direct dynamic work-stealing decisions, improving system efficiency and performance.

In various embodiments, the method 400 may be performed for each processing unit of the multi-processor computing device. For example, the multi-processor computing device may concurrently execute one or more instances of the method 400 (e.g., one or more threads for executing the method 400) to handle work stealing for tasks of each processing unit. In some embodiments, various operations of the method 400 may be performed by a runtime functionality (e.g., runtime functionality module 210 of FIGS. 2A-2D) executing in a processing unit of the multi-processor computing device (e.g., via an application processor, the CPU 102 of the multi-processor computing device 101 of FIGS. 1-2D, etc.).

Referring to the method 400, the multi-processor computing device may determine whether there are any work items available to be transferred or "stolen" from a first processing unit and/or an associated task in determination block 402. In other words, the multi-processor computing device may determine whether the first processing unit and/or the associated task is to be treated as a victim processor at a given time. For example, the multi-processor computing device may determine whether the first processing unit and/or the associated task is executing work items that are capable of being executed elsewhere (e.g., iterations of a parallel loop routine) and/or whether there are any work items that the first processing unit is not already processing (or scheduled to process in the near future). Such a determination may be made by the multi-processor computing device by evaluating the task queue of the first processing unit, such as by querying the number and/or type of currently pending work items. In some embodiments, the first processing unit and/or the associated task may only be a victim processor when the number of pending work items in the corresponding task queue exceeds a threshold number. For example, the multi-processor computing device may identify a minimum number of work items needed to make any migration of work items from the first processing unit to another processing unit beneficial. Such a threshold may be calculated based on a comparison of an estimated first time required to perform a computation (e.g., process a certain number of work items) locally at the first processing unit and an estimated second time required to perform the computation at another processing unit.

In some embodiments, the multi-processor computing device may calculate a priority as described above to determine whether the first processing unit and/or the associated task may be stolen from. For example, when the first processing unit's relative priority is higher than other processing units, the multi-processor computing device may determine that no other processing unit is capable of stealing from the first processing unit regardless of the availability of work items, and thus may forgo any further operations to allow work-stealing from the first processing unit for a time period.

In response to determining that there are no work item(s) available to be stolen from the first processing unit and/or the associated task (i.e., determination block 402="No"), the first processing unit and/or the associated task may not be a victim processor at the current time, and thus the multi-processor computing device may continue with the victim processor determination operations in determination block 402. In some embodiments, the victim processor determinations of determination block 402 may be performed immediately or after a predefined period of time (e.g., after the elapse of a predetermined wait period).

In response to determining that there is at least one work item available to be stolen from the first processing unit and/or the associated task (i.e., determination block 402="Yes"), the first processing unit and/or the associated task may be determined to be a victim processor at the current time. In optional block 404, the multi-processor computing device may identify any work-ready processors (e.g., work-ready processing unit(s), work-ready task(s)) that are ready to receive work items from the victim processor. For example, the multi-processor computing device may evaluate various API calls, interrupts, and/or stored data (e.g., system variables, data within work-ready processor queues, etc.) that indicate one or more work-ready processors have requested or are otherwise ready to be assigned work items from the victim processor. The operations in optional block 404 may be optional as the operations may apply to embodiments that rely upon "work-ready queues" as described herein, and thus the operations of optional block 404 may not be applicable for other embodiments that utilize a shared memory and work-stealing data structure as described.

In some embodiments, work-ready processors may specifically request to receive work items from particular victim processors and/or may request to receive from any available victim processor. For example, a ready work-ready processor may be placed within a work-ready processor queue for a specific processing unit (e.g., a GPU's work-ready processor queue, etc.). As another example, a ready work-ready task may be placed within a general queue for receiving work items from any task queue of any processing unit.

The multi-processor computing device may determine whether there are one or more work-ready processors ready to receive work items from the victim processor in determination block 406. In response to determining that there are no work-ready processors ready to receive from the victim processor (i.e., determination block 406="No"), the multi-processor computing device may continue with the victim processor determination operations in determination block 402.

In response to determining there is at least one work-ready processor ready to receive from the victim processor (i.e., determination block 406="Yes"), the multi-processor computing device may obtain static characteristics data associated with the victim processor and the one or more work-ready processors in block 408. Such static characteristics may include information describing attributes/capabilities of the processing units corresponding to the work-ready processors and victim processor. For example, static characteristics data for each work-ready processor and the victim processor may include data indicating a technology used (e.g., architecture, special abilities, operating specifications and/or thresholds, etc.), a location in the topology of the multi-processor computing device (e.g., near a modem, etc.), and/or manufacturer data (e.g., age/install date, etc.). In some embodiments, the static characteristics data may be obtained by the multi-processor computing device once at the time of manufacture of the various processing units or the multi-processor computing device, at each boot-up of the multi-processor computing device, on a periodic basis (e.g., daily, weekly, monthly, etc.), or any combination thereof. In some embodiments, obtaining the static characteristics may include identifying values for global coefficients (e.g., $\alpha_i$, $\beta_i$, $\gamma_i$) used in Equation 1 (i.e., $P_i=\alpha_i*f_i*Temp_i+\beta_i*g_i*Power_i+\gamma_i*h_i*Freq_i$) as described above.

In block 410, the multi-processor computing device may obtain dynamic characteristics data associated with the victim processor and the one or more work-ready processors. The dynamic characteristics data may include information related to the current, recent, and/or historical execution of operations on the various processing units. For example, the dynamic characteristics may include average, minimum, maximum, current, and/or projected values for power consumption, frequency, and/or temperature for the various processing units associated with the victim processor and the one or more work-ready processors. In some embodiments, obtaining the dynamic characteristics may include identifying values for local coefficients (e.g., $f_i$, $g_i$, $h_i$) and/or local measurements (e.g., $Temp_i$, $Power_i$, $Freq_i$) used in Equation 1 (i.e., $P_i=\alpha_i*f_i*Temp_i+\beta_i*g_i*Power_i+\gamma_i*h_i*Freq_i$) as described above.

In block 412, the multi-processor computing device may calculate priority values for the victim processor and the one or more work-ready processors based on the obtained data. For example, the multi-processor computing device may use obtained values for global coefficients, local coefficients, and local measurements related to the various processing units of the victim processor and one or more work-ready processors to calculate a relative priority value for each using the Equation 1 (i.e., $P_i=\alpha_i*f_i*Temp_i+\beta_i*g_i*Power_i+\gamma_i*h_i*Freq_i$) as described above. In other words, the multi-processor computing device may balance data of operating states (e.g., temperature, power consumption, and frequency factors) to calculate relative priorities of the victim processor and one or more work-ready processors.

In determination block 414, the multi-processor computing device may determine whether more than one work-ready processor is competing to receive work items from the victim processor. For example, when there are more than one work-ready processors, the resulting competition for the victim processor's work items may require a selection or determination of a winning work-ready processor that may receive work items from the victim processor.

In response to determining that there is more than one work-ready processor (i.e., determination block 414="Yes"), the multi-processor computing device may identify a winning work-ready processor among the plurality of work-ready processors based on the calculated priority values in block 416. For example, the multi-processor computing device may simply compare the calculated relative priority values to find the highest value (i.e., the highest priority). Determining a winning work-ready processor with the calculated priorities may not rely on randomness or timing (e.g., the time at which the plurality of work-ready processors become ready to steal). Instead, the winning work-ready processor may be determined based on the ability of the processor to process work items given various operating conditions of the system. In some embodiments, the multi-processor computing device may identify more than one winning work-ready processor, such as a first winning work-ready processing unit and a second winning work-ready processing unit. A plurality of winning work-ready processors may be possible when the victim processor has an abundance of available work items to steal, the calculated priorities of the work-ready processors are within a certain threshold of each other, and/or other factors that make multiple recipients of work items feasible at a given time. In some embodiments, the multi-processor computing device may determine percentages of allocations for the winning work-ready processors, such as by using Equations 5-6 as described that may assign work items in proportion to priorities.

In response to determining that there is only one work-ready processor (i.e., determination block 414="No"), or in response to performing the identification operations in block 416, the multi-processor computing device may calculate a number of work items to transfer to the winning work-ready processor (or the only work-ready processor) based on the calculated priority values of the victim processor and winning work-ready processor (or only work-ready processor) in block 418. For example, when the victim processor has a plurality of work items available to be stolen, the multi-processor computing device may determine a first number of the plurality of work items that may remain for execution by the victim processing unit and a second number of work items that may be transferred to the work-ready processor. In some embodiments, the multi-processor computing device may calculate the number of work items to transfer to the winning work-ready processor using Equations 5-6 as described above.

In block 420, the multi-processor computing device may reassign the calculated number of work items from the victim processor to the winning work-ready processor (or only work-ready processor). For example, the multi-processor computing device may transfer one or more work items and/or related data to the task queue of a winning work-ready processing unit from the task queue of the victim processor. As another example the multi-processor computing device may enable the winning work-ready processor to adjust data in a shared work-stealing data structure to indicate that work items in a shared memory that were previously assigned to the victim processor are now assigned to the winning work-ready processor. In some embodiments, the reassignment of work items between task queues may include data transfers between queues and/or assignments of access to particular data, such as via a check-out or assignment procedure for a shared memory unit.

The multi-processor computing device may perform the operations of the method 400 in a continuous or periodic loop, returning again to determining whether there are any work items available to be stolen from a victim processor in determination block 402. With each iteration, the processor units that are work-ready and the victim processor may change as the workloads of each processing unit very with time. Thus, a work-ready processing unit at one time may later become a victim processor as its queue of work items increases.

Figure 4B:
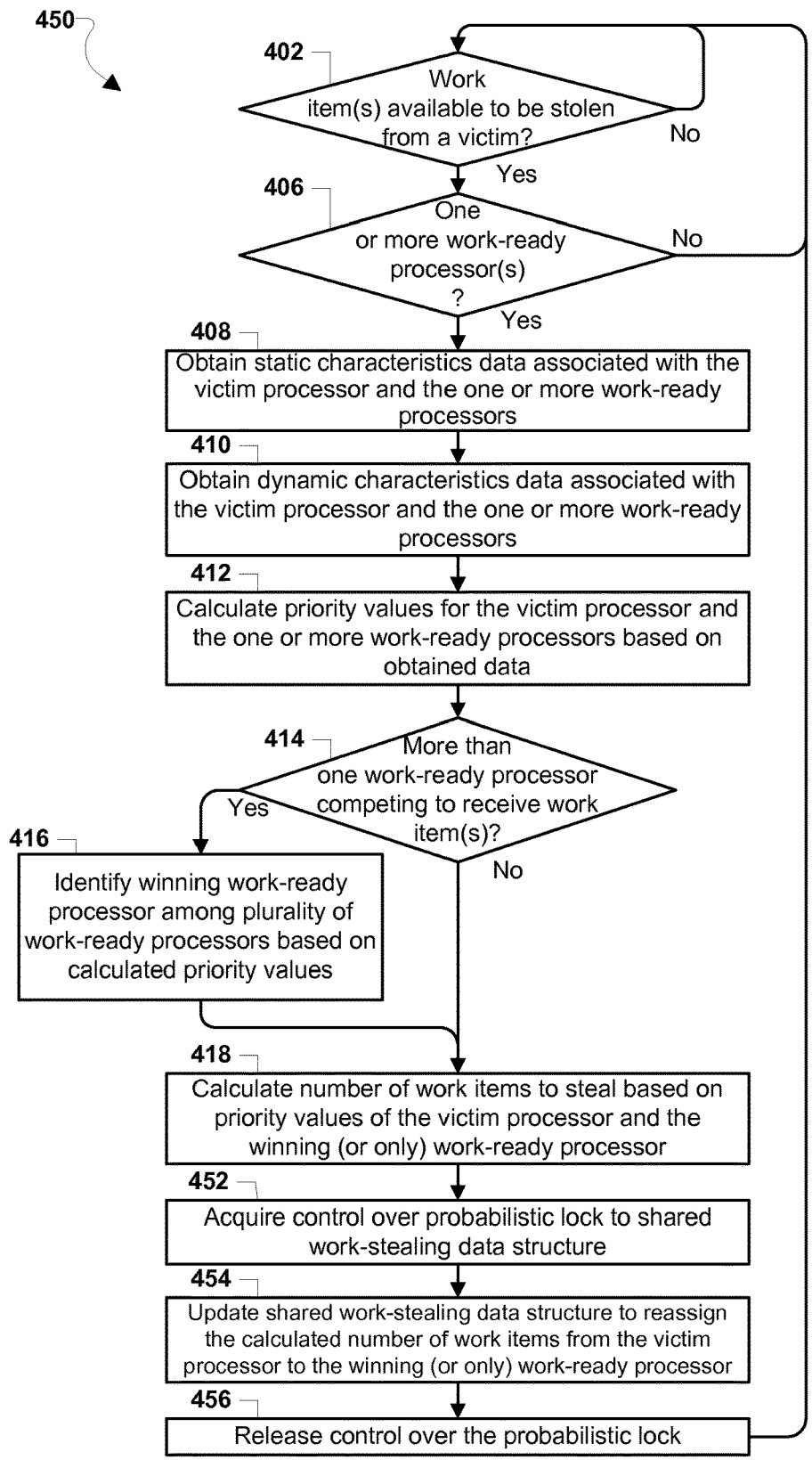

As described, embodiment methods may be implemented in various work-stealing and/or data parallelism frameworks. For example, embodiment priority calculations may be used for processing units that utilize task queues and/or access shared memory to manage assigned work items. FIG. 4B illustrates an embodiment method 450 that includes operations for a multi-processor computing device that utilizes a shared memory and shared work-stealing data structure implementation.

Some operations of the method 450 may be similar to the method 400 and may be performed for each processing unit of the multi-processor computing device. For example, the operations of blocks 402, 406-418 may be similar to the operations of like numbered blocks described above with reference to FIG. 4A. Further, in some embodiments, the multi-processor computing device may concurrently execute one or more instances of the method 450 (e.g., one or more threads for executing the method 400) to handle work stealing for tasks of each processing unit. In some embodiments, various operations of the method 450 may be performed by a runtime functionality (e.g., runtime functionality module 210 of FIGS. 2A-2D) executing in a processing unit of the multi-processor computing device (e.g., via an application processor, such as the CPU 102 of the multi-processor computing device 101 of FIGS. 1-2D, etc.).

In general, whenever a task (or associated processing unit) becomes free by completing originally-assigned work items of a shared task/workload, that processing unit (a work-ready processor) may then contend to steal work items by updating a shared work-stealing data structure. A victim processor may be identified from the work-stealing data structure as part of such an access/modification process. In various embodiments, probabilistic locks (or atomics) may be used to deal with concurrent accesses to the shared data structure by multiple work-ready processing units.

Referring to FIG. 4B, in response to performing the operations of determination block 414 (i.e., determination block 414="No") or block 416, the multi-processor computing device may acquire, via a winning processor, control over a probabilistic lock for a shared data structure based on the calculated priority value of the winning work-ready processor in block 452. In block 454, the multi-processor may update, via the winning processor, the shared data structure to indicate the number of work items transferred to the winning work-ready processor in response to acquiring the control over the probabilistic lock.

In block 456, the multi-processor may release, via the winning processor, control over the probabilistic lock, and thus also free the work-stealing data structure to be potentially accessed by other processing units. The multi-processor computing device may then continue with the determination operations in determination block 402.

Figure 5:
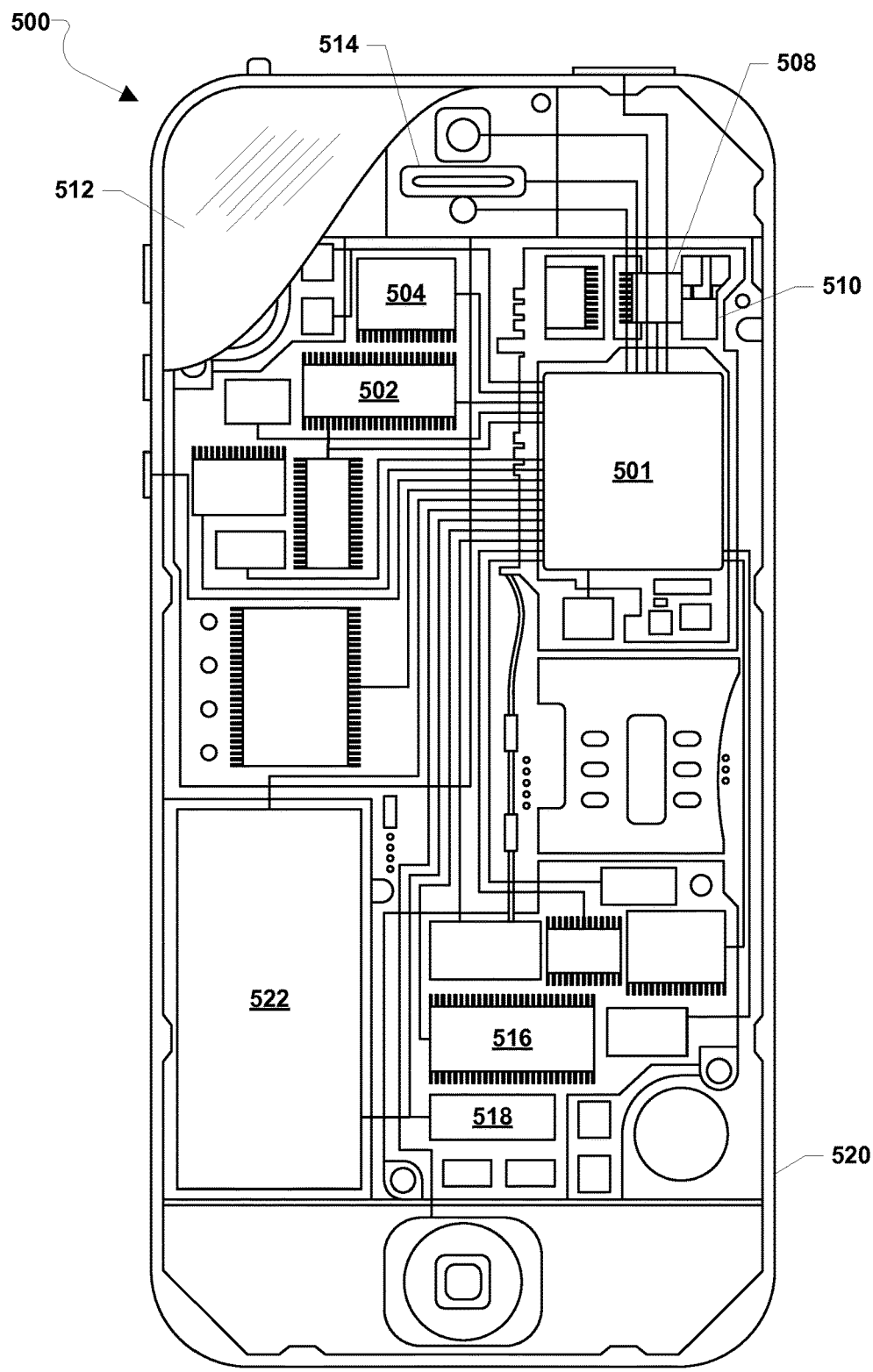
FIG. 5 is a component block diagram of a computing device suitable for use in some embodiments.

Various forms of computing devices, including personal computers, mobile devices, and laptop computers, may be used to implement the various embodiments. Such computing devices may typically include the components illustrated in FIG. 5, which illustrates an example multi-processor mobile device 500. In various embodiments, the mobile device 500 may include a processor 501 coupled to a touch screen controller 504 and an internal memory 502. The processor 501 may include a plurality of multi-core ICs designated for general or specific processing tasks. In some embodiments, other processing units may also be included and coupled to the processor 501 (e.g., GPU, DSP, etc.).

The internal memory 502 may be volatile and/or non-volatile memory, and may also be secure and/or encrypted memory, or unsecure and/or unencrypted memory, or any combination thereof. The touch screen controller 504 and the processor 501 may also be coupled to a touch screen panel 512, such as a resistive-sensing touch screen, capacitive-sensing touch screen, infrared sensing touch screen, etc. The mobile device 500 may have one or more radio signal transceivers 508 (e.g., Bluetooth®, ZigBee®, Wi-Fi®, RF radio) and antennae 510, for sending and receiving, coupled to each other and/or to the processor 501. The transceivers 508 and antennae 510 may be used with the above-mentioned circuitry to implement the various wireless transmission protocol stacks and interfaces. The mobile device 500 may include a cellular network wireless modem chip 516 that enables communication via a cellular network and is coupled to the processor 501. The mobile device 500 may include a peripheral device connection interface 518 coupled to the processor 501. The peripheral device connection interface 518 may be singularly configured to accept one type of connection, or multiply configured to accept various types of physical and communication connections, common or proprietary, such as USB, FireWire, Thunderbolt, or PCIe. The peripheral device connection interface 518 may also be coupled to a similarly configured peripheral device connection port (not shown). The mobile device 500 may also include speakers 514 for providing audio outputs. The mobile device 500 may also include a housing 520, constructed of a plastic, metal, or a combination of materials, for containing all or some of the components discussed herein. The mobile device 500 may include a power source 522 coupled to the processor 501, such as a disposable or rechargeable battery. The rechargeable battery may also be coupled to the peripheral device connection port to receive a charging current from a source external to the mobile device 500.

Various processors (or processing units) described herein may be any programmable microprocessor, microcomputer or multiple processor chip or chips that may be configured by software instructions (applications) to perform a variety of functions, including the functions of the various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The operations of a method or algorithm disclosed herein may be embodied in a processor-executable software module or processor-executable software instructions, which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic data storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray Disc® where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the embodiment techniques of the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method implemented by a processor of a multi-processor computing device to proactively balance workloads among a plurality of processing units by making work-stealing determinations based on operating state data, comprising:

obtaining static characteristics data associated with each of a victim processor and one or more of the plurality of processing units that are ready to steal work items from the victim processor (work-ready processors);

obtaining dynamic characteristics data including values associated with temperature and power consumption, associated with each of the victim processor and the work-ready processors;

calculating a priority value ($P_i$) for each of the victim processor and the work-ready processors based on the obtained data, wherein i represents an index for one of the victim processor and the work-ready processors and $P_i$ represents a calculated priority value for a processing unit associated with the index for one of the victim processor and the work-ready processors;

determining a winning work-ready processor by comparing the priority values $P_i$ of the victim processor and the work-ready processors;

acquiring, via the winning work-ready processor, control over a probabilistic lock for a shared data structure based on the calculated priority value of the winning work-ready processor;

updating, via the winning work-ready processor, the shared data structure to indicate the number of work items transferred to the winning work-ready processor in response to acquiring control over the probabilistic lock; and transferring a number of work items from the victim processor to the winning work-ready processor based on the calculated priority values.

2. The method of claim 1, wherein the work-ready processors are ready to steal the work items from the victim processor in response to the work-ready processors finishing respective assigned work items.

3. The method of claim 1, wherein the static characteristics data associated with each of the victim processor and the work-ready processors include any of data indicating a technology used, a location in a topology of the multi-processor computing device, and manufacturer data.

4. The method of claim 1, wherein the static characteristics data is obtained at a time of manufacture of the multi-processor computing device, at each boot-up of the multi-processor computing device, on a periodic basis, or any combination thereof.

5. The method of claim 1, wherein the dynamic characteristics data associated with each of the victim processor and the work-ready processors includes local measurements of each of the victim processor and the work-ready processors.

6. The method of claim 1, wherein the dynamic characteristics data associated with each of the victim processor and the work-ready processors further includes values associated with frequency.

7. The method of claim 1, wherein calculating the priority values for each of the victim processor and the work-ready processors based on the obtained data comprises calculating the priority values ($P_i$) using the following equation:

$$P_i = \alpha_i * f_i * \text{Temp}_i + \beta_i * g_i * \text{Power}_i + \gamma_i * h_i * \text{Freq}_i,$$

wherein $\alpha_i$ represents a global coefficient for temperature, $f_i$ represents a local coefficient for the temperature for the processing unit, $\text{Temp}_i$ represents a formula over a local temperature measurement for the processing unit, $\beta_i$ represents a global coefficient for power consumption, $g_i$ represents a local coefficient for the power consumption for the processing unit, $\text{Power}_i$ represents a formula over a local power consumption measurement for the processing unit, $\gamma_i$ represents a global coefficient for frequency, $h_i$ represents a local coefficient for the frequency of the processing unit, and $\text{Freq}_i$ represents a formula over a local frequency measurement for the processing unit.

8. The method of claim 7, wherein obtaining the static characteristics data associated with each of the victim processor and the work-ready processors comprises obtaining the global coefficient for temperature, the global coefficient for power consumption, and the global coefficient for frequency.

9. The method of claim 7, wherein obtaining dynamic characteristics data associated with each of the victim processor and the work-ready processors comprises obtaining the local coefficient for the temperature for the processing unit, the local temperature measurement for the processing unit, the local coefficient for the power consumption for the processing unit, the local power consumption measurement for the processing unit, the local coefficient for the frequency of the processing unit, and the local frequency measurement for the processing unit.

10. The method of claim 1, further comprising calculating the number of work items to transfer to the winning work-ready processor based on the calculated priority values of the victim processor and the winning work-ready processor.

11. The method of claim 10, wherein calculating the number of work items to transfer to the winning work-ready processor based on the calculated priority values of the victim processor and the winning work-ready processor comprises calculating the number of work items to transfer using the following equations:

$$N_i = K * (P_i / (P_i + P_j));$$

$$N_j = K - N_i;$$

wherein i represents a first task index associated with the victim processor, j represents a second task index associated with the winning work-ready processor, K represents a total number of work items remaining to be processed by the victim processor prior to stealing, $P_i$ represents a calculated priority value of the victim processor, and $P_j$ represents the calculated priority value of the winning work-ready processor, $N_i$ represents the number of work items to transfer to the winning work-ready processor, and $N_j$ represents a number of work items to remain with the victim processor.

12. The method of claim 1, wherein each of the victim processor and the work-ready processors is associated with a different processing unit in the plurality of processing units.

13. The method of claim 1, wherein each of the victim processor and the work-ready processors is associated with a different task executing on one of the plurality of processing units.

14. The method of claim 1, wherein the work items are different iterations of a parallel loop routine.

15. The method of claim 1, wherein the plurality of processing units includes two or more of a first central processing unit (CPU), a graphics processing unit (GPU), and a digital signal processor (DSP).

16. The method of claim 1, wherein the multi-processor computing device is one of a heterogeneous multi-core computing device, a homogeneous multi-core computing device, a distributed computing server.

17. A computing device, comprising:
a memory; and
a processor of a plurality of processing units, wherein the processor is coupled to the memory and is configured with processor-executable instructions to perform operations comprising:
obtaining static characteristics data associated with each of a victim processor and one or more of the plurality of processing units that are ready to steal work items from the victim processor (work-ready processors);
obtaining dynamic characteristics data including values associated with temperature and power consumption, associated with each of the victim processor and the work-ready processors;
calculating a priority value ($P_i$) for each of the victim processor and the work-ready processors based on the obtained data, wherein i represents an index for one of the victim processor and the work-ready processors and $P_i$ represents a calculated priority value for a processing unit associated with the index for one of the victim processor and the work-ready processors;

determining a winning work-ready processor by comparing the priority values $P_i$ of the victim processor and the work-ready processors;

acquiring, via the winning work-ready processor, control over a probabilistic lock for a shared data structure based on the calculated priority value of the winning work-ready processor;

updating, via the winning work-ready processor, the shared data structure to indicate the number of work items transferred to the winning work-ready processor in response to acquiring control over the probabilistic lock; and transferring a number of work items from the victim processor to the winning work-ready processor based on the calculated priority values.

18. The computing device of claim 17, wherein the static characteristics data associated with each of the victim processor and the work-ready processors include any of data indicating a technology used, a location in a topology of the computing device, and manufacturer data.

19. The computing device of claim 17, wherein the static characteristics data is obtained at a time of manufacture of the computing device, at each boot-up of the computing device, on a periodic basis, or any combination thereof.

20. The computing device of claim 17, wherein the dynamic characteristics data associated with each of the victim processor and the work-ready processors includes local measurements of each of the victim processor and the work-ready processors.

21. The computing device of claim 17, wherein the dynamic characteristics data associated with each of the victim processor and the work-ready processors further includes values associated with frequency.

22. The computing device of claim 17, wherein the processor is configured with processor-executable instructions to perform operations such that calculating the priority values for each of the victim processor and the work-ready processors based on the obtained data comprises calculating the priority values using the following equation:

$$P_i = \alpha_i * f_i * \text{Temp}_i + \beta_i * g_i * \text{Power}_i + \gamma_i * h_i * \text{Freq}_i,$$

wherein $\alpha_i$ represents a global coefficient for temperature, $f_i$ represents a local coefficient for the temperature for the processing unit, $\text{Temp}_i$ represents a formula over a local temperature measurement for the processing unit, $\beta_i$ represents a global coefficient for power consumption, $g_i$ represents a local coefficient for the power consumption for the processing unit, $\text{Power}_i$ represents a formula over a local power consumption measurement for the processing unit, $\gamma_i$ represents a global coefficient for frequency, $h_i$ represents a local coefficient for the frequency of the processing unit, and $\text{Freq}_i$ represents a formula over a local frequency measurement for the processing unit.

23. The computing device of claim 22, wherein the processor is configured with processor-executable instructions to perform operations such that obtaining the static characteristics data associated with each of the victim processor and the work-ready processors comprises obtaining the global coefficient for temperature, the global coefficient for power consumption, and the global coefficient for frequency.

24. The computing device of claim 22, wherein the processor is configured with processor-executable instructions to perform operations such that obtaining dynamic characteristics data associated with each of the victim processor and the work-ready processors comprises obtaining the local coefficient for the temperature for the processing unit, the local temperature measurement for the processing unit, the local coefficient for the power consumption for the processing unit, the local power consumption measurement for the processing unit, the local coefficient for the frequency of the processing unit, and the local frequency measurement for the processing unit.

25. The computing device of claim 17, wherein the processor is configured with processor-executable instructions to perform operations further comprising calculating the number of work items to transfer to the winning work-ready processor based on the calculated priority values of the victim processor and the winning work-ready processor.

26. The computing device of claim 25, wherein the processor is configured with processor-executable instructions to perform operations such that calculating the number of work items to transfer to the winning work-ready processor based on the calculated priority values of the victim processor and the winning work-ready processor comprises calculating the number of work items to transfer using the following equations:

$$N_i = K * (P_i/(P_i + P_j));$$

$$N_j = K - N_i;$$

wherein i represents a first task index associated with the victim processor, j represents a second task index associated with the winning work-ready processor, K represents a total number of work items remaining to be processed by the victim processor prior to stealing, $P_j$ represents a calculated priority value of the victim processor, and $P_i$ represents the calculated priority value of the winning work-ready processor, $N_i$ represents the number of work items to transfer to the winning work-ready processor, and $N_j$ represents a number of work items to remain with the victim processor.

27. A non-transitory processor-readable storage medium having stored thereon processor-executable instructions configured to cause a processor of a plurality of processing units of a computing device to perform operations comprising:

obtaining static characteristics data associated with each of a victim processor and one or more of the plurality of processing units that are ready to steal work items from the victim processor (work-ready processors);

obtaining dynamic characteristics data including values associated with temperature and power consumption, associated with each of the victim processor and the work-ready processors;

calculating a priority value ($P_i$) for each of the victim processor and the work-ready processors based on the obtained data, wherein i represents an index for one of the victim processor and the work-ready processors and $P_i$ represents a calculated priority value for a processing unit associated with the index for one of the victim processor and the work-ready processors;

determining a winning work-ready processor by comparing the priority values $P_i$ of the victim processor and the work-ready processors;

acquiring, via the winning work-ready processor, control over a probabilistic lock for a shared data structure based on the calculated priority value of the winning work-ready processor;

updating, via the winning work-ready processor, the shared data structure to indicate the number of work items transferred to the winning work-ready processor in response to acquiring control over the probabilistic lock; and transferring a number of work items from the victim processor to the winning work-ready processor based on the calculated priority values.

28. A computing device, comprising:

means for obtaining static characteristics data associated with each of a victim processor and one or more of a plurality of processing units that are ready to steal work items from the victim processor (work-ready processors);

means for obtaining dynamic characteristics data including values associated with temperature and power consumption, associated with each of the victim processor and the work-ready processors;

means for calculating a priority value ($P_i$) for each of the victim processor and the work-ready processors based on the obtained data, wherein i represents an index for one of the victim processor and the work-ready processors and $P_i$ represents a calculated priority value for a processing unit associated with the index for one of the victim processor and the work-ready processors;

means for determining a winning work-ready processor by comparing the priority values $P_i$ of the victim processor and the work-ready processors;

means for acquiring, via the winning work-ready processor, control over a probabilistic lock for a shared data structure based on the calculated priority value of the winning work-ready processor;

means for updating, via the winning work-ready processor, the shared data structure to indicate the number of work items transferred to the winning work-ready processor in response to acquiring control over the probabilistic lock; and means for transferring a number of work items from the victim processor to the winning work-ready processor based on the calculated priority values.

* * * * *